(12) United States Patent
Kim et al.

(10) Patent No.: US 11,601,883 B2
(45) Date of Patent: Mar. 7, 2023

(54) TECHNIQUES FOR MANAGING UPLINK TRANSMISSIONS FOR POWER SAVING

(71) Applicant: QUALCOMM Incorporated, San Diego, CA (US)

(72) Inventors: Yuchul Kim, San Diego, CA (US); Krishna Kiran Mukkavilli, San Diego, CA (US); Jay Kumar Sundararajan, San Diego, CA (US); Hwan Joon Kwon, San Diego, CA (US); Yeliz Tokgoz, San Diego, CA (US); Peter Pui Lok Ang, San Diego, CA (US); Wanshi Chen, San Diego, CA (US); Huilin Xu, Temecula, CA (US); Jing Lei, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/477,303

(22) Filed: Sep. 16, 2021

(65) Prior Publication Data
US 2022/0095225 A1 Mar. 24, 2022

Related U.S. Application Data

(60) Provisional application No. 63/080,384, filed on Sep. 18, 2020.

(51) Int. Cl.
*H04W 52/02* (2009.01)
*G06F 3/01* (2006.01)
(Continued)

(52) U.S. Cl.
CPC ........ *H04W 52/0225* (2013.01); *G06F 3/017* (2013.01); *H04L 67/131* (2022.05); *H04W 28/22* (2013.01)

(58) Field of Classification Search
CPC .............. H04W 52/0225; H04W 28/22; H04L 67/131; G06F 3/017
See application file for complete search history.

(56) References Cited

U.S. PATENT DOCUMENTS

| | | |
|---|---|---|
| 2014/0064160 A1 | 3/2014 | Verger et al. |
| 2017/0102772 A1 | 4/2017 | Hesch et al. |

(Continued)

OTHER PUBLICATIONS

International Search Report and Written Opinion—PCT/US2021/050814—ISA/EPO—dated Dec. 14, 2021.

*Primary Examiner* — Gerald Johnson
(74) *Attorney, Agent, or Firm* — Holland & Hart LLP

(57) ABSTRACT

Methods, systems, and devices for wireless communications are described. A user equipment (UE) may support various extended reality (XR) applications. In some examples of XR applications, features from the real and virtual environments may be overlaid and displayed to a user for consumption via the UE. To avoid visual conflicts, such as misaligning objects from the real and virtual environments, and other visual conflicts, the UE may generate and send pose information to a network (e.g., a server hosting the XR application). The UE may be configured to manage transmission of pose information to the network, which may result in reduced power consumption. For example, the UE may determine a downlink burst occasion for the XR application, generate pose information associated with the UE and the XR application, and transmit the pose information only during the downlink burst occasion.

30 Claims, 22 Drawing Sheets

(51) Int. Cl.
*H04W 28/22* (2009.01)
*H04L 67/131* (2022.01)

(56) References Cited

U.S. PATENT DOCUMENTS

| | | |
|---|---|---|
| 2019/0349815 A1 | 11/2019 | Tiirola et al. |
| 2020/0058152 A1 | 2/2020 | Zhang et al. |
| 2020/0280971 A1 | 9/2020 | Moon et al. |
| 2021/0255458 A1* | 8/2021 | Yoon .................. G02B 27/0172 |

* cited by examiner

TECHNIQUES FOR MANAGING UPLINK TRANSMISSIONS FOR POWER SAVING

CROSS REFERENCE

The present Application for Patent claims the benefit of U.S. Provisional Patent Application No. 63/080,384 by KIM et al., entitled "TECHNIQUES FOR MANAGING UPLINK TRANSMISSIONS FOR POWER SAVING," filed Sep. 18, 2020, assigned to the assignee hereof, and expressly incorporated by reference herein.

TECHNICAL FIELD

The following relates to wireless communications, and more specifically to techniques for managing uplink wireless communications for power saving.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). Components within a wireless communication system may be coupled (for example, operatively, communicatively, functionally, electronically, and/or electrically) to each other.

A wireless multiple-access communications system may include one or more base stations or one or more network access nodes, each simultaneously supporting communication for multiple communication devices, which may be otherwise known as user equipment (UE). These communication devices may support various extended reality (XR) applications, such as augmented reality (AR), mixed reality (MR), and virtual reality (VR). In XR applications, these communication devices may generate and send pose information to avoid visual conflicts, such as misaligning objects between real and virtual environments, and other visual conflicts. In some cases, transmission of the pose information and other control information by these communication devices may occur too frequent and result in unnecessary added power consumption. It therefore may be desirable to control transmission of pose information and other control information for power saving, among other benefits.

SUMMARY

Various aspects of the present disclosure relate to configuring a communication device, such as a UE and a base station, for example, an eNodeB (eNB), a next-generation NodeB or a giga-NodeB (either of which may be referred to as a gNB) of wireless communication system to support managing uplink wireless communications for power saving. For example, the UE may be configured to generate and transmit pose information when a downlink burst (e.g., a downlink frame transmission associated with an XR application) from the base station is occurring. This allows an alignment between the uplink transmission (e.g., pose information transmission) and downlink reception (e.g., frame reception), which may reduce unnecessary a UE wakeup period and provides an opportunity for the UE to enter an extended sleep (low power) state. To support the alignment between the uplink transmission and the downlink reception, the UE may be configured to synchronize an uplink transmit rate with a downlink burst rate. The UE may be configured to also determine one or more slots relative to a downlink slot of the downlink burst for transmitting the pose information. By managing transmission of the pose information or other control information related to XR applications, the UE may decrease power consumption. The present disclosure may, as a result, also include improvements to pose or other control information operations and, in some examples, may promote high reliability and low latency XR-related operations, among other benefits.

A method of wireless communication at a UE is described. The method may include determining a downlink burst occasion for an XR application, generating pose information associated with the UE and the XR application, and transmitting the pose information during the downlink burst occasion.

An apparatus for wireless communication is described. The apparatus may include at least one processor, memory coupled (e.g., operatively, communicatively, functionally, electronically, or electrically) to the at least one processor, and instructions stored in the memory and executable by the at least one processor to cause the apparatus to determine a downlink burst occasion for an XR application, generate pose information associated with the UE and the XR application, and transmit the pose information during the downlink burst occasion.

Another apparatus for wireless communication is described. The apparatus may include means for determining a downlink burst occasion for an XR application, generating pose information associated with the UE and the XR application, and transmitting the pose information during the downlink burst occasion.

A non-transitory computer-readable medium storing code for wireless communication at a UE is described. The code may include instructions executable by at least one processor to determine a downlink burst occasion for an XR application, generate pose information associated with the UE and the XR application, and transmit the pose information during the downlink burst occasion.

Some examples of the method, apparatuses, and non-transitory computer-readable medium described herein may further include operations, features, means, or instructions for determining an uplink transmit rate associated with the pose information, the uplink transmit rate may be greater than or equal to a downlink transmit rate associated with the downlink burst occasion, where transmitting the pose information includes transmitting the pose information based on the uplink transmit rate.

Some examples of the method, apparatuses, and non-transitory computer-readable medium described herein may further include operations, features, means, or instructions for adjusting the uplink transmit rate associated with the pose information based on the downlink transmit rate associated with the downlink burst occasion, where transmitting the pose information includes transmitting the pose information once during the downlink burst occasion based on the adjusted uplink transmit rate.

In some examples of the method, apparatuses, and non-transitory computer-readable medium described herein, adjusting the uplink transmit rate may include operations, features, means, or instructions for decreasing the uplink transmit rate to match the downlink transmit rate.

Some examples of the method, apparatuses, and non-transitory computer-readable medium described herein may further include operations, features, means, or instructions for adjusting an uplink pose generation rate associated with the pose information based on the modified uplink transmit rate, where generating the pose information includes generating the pose information associated with the UE and the XR application based on the adjusted uplink pose generation rate, where the adjusted uplink pose generation rate matches a downlink frame generation rate.

Some examples of the method, apparatuses, and non-transitory computer-readable medium described herein may further include operations, features, means, or instructions for generating a set of pose information associated with the UE, determining a subset of pose information of the set of pose information to transmit during the downlink burst occasion based on a configuration, where transmitting the pose information includes transmitting the subset of pose information jointly during the downlink burst occasion.

In some examples of the method, apparatuses, and non-transitory computer-readable medium described herein, the subset of pose information includes two or more consecutive generated pose information.

Some examples of the method, apparatuses, and non-transitory computer-readable medium described herein may further include operations, features, means, or instructions for receiving, from a base station, the configuration to transmit the subset of pose information during the downlink burst occasion.

Some examples of the method, apparatuses, and non-transitory computer-readable medium described herein may further include operations, features, means, or instructions for identifying an uplink transmit rate or an uplink periodicity, or both, associated with the pose information based on the configuration, where transmitting the subset of pose information includes transmitting the subset of pose information during the downlink burst occasion based on the identified uplink transmit rate or the uplink periodicity, or both.

Some examples of the method, apparatuses, and non-transitory computer-readable medium described herein may further include operations, features, means, or instructions for enabling a timer based on the downlink burst occasion.

Some examples of the method, apparatuses, and non-transitory computer-readable medium described herein may further include operations, features, means, or instructions for switching from a first state to a second state based on the enabled timer, where the first state corresponds to a first power level lower than a second power level associated with the second state.

Some examples of the method, apparatuses, and non-transitory computer-readable medium described herein may further include operations, features, means, or instructions for determining a beginning period associated with an earliest transport block transmission of one or more transport block transmissions associated with the downlink burst occasion, determining an earliest uplink slot following the beginning period associated with the earliest transport block transmission, where transmitting the pose information includes transmitting the pose information associated with the UE in the earliest uplink slot following the beginning period associated with the earliest transport block transmission.

In some examples of the method, apparatuses, and non-transitory computer-readable medium described herein, the beginning period associated with the earliest transport block transmission corresponds to a beginning of an active discontinuous reception (DRX) duration.

In some examples of the method, apparatuses, and non-transitory computer-readable medium described herein, the active DRX duration may be aligned with an expected beginning period of the earliest transport block transmission.

Some examples of the method, apparatuses, and non-transitory computer-readable medium described herein may further include operations, features, means, or instructions for determining an earliest downlink slot associated with the earliest transport block transmission of the one or more transport block transmissions associated with the downlink burst occasion based on the beginning period associated with the earliest transport block transmission, where determining the earliest uplink slot may be based on the earliest downlink slot.

Some examples of the method, apparatuses, and non-transitory computer-readable medium described herein may further include operations, features, means, or instructions for determining one or more uplink slots preceding the earliest downlink slot associated with the earliest transport block transmission of the one or more transport block transmissions associated with the downlink burst occasion, where transmitting the pose information includes transmitting the pose information associated with the UE during the one or more uplink slots preceding the earliest downlink slot associated with the earliest transport block transmission.

In some examples of the method, apparatuses, and non-transitory computer-readable medium described herein, the one or more uplink slots satisfy a slot window threshold.

A method of wireless communication at a base station is described. The method may include transmitting, to a UE, one or more frames associated with an XR application during a downlink burst occasion and receiving pose information associated with the UE and the XR application during the downlink burst occasion.

An apparatus for wireless communication is described. The apparatus may include at least one processor, memory coupled (e.g., operatively, communicatively, functionally, electronically, or electrically) to the at least one processor, and instructions stored in the memory and executable by the at least one processor to cause the apparatus to transmit, to a UE, one or more frames associated with an XR application during a downlink burst occasion and receive pose information associated with the UE and the XR application during the downlink burst occasion.

Another apparatus for wireless communication is described. The apparatus may include means for transmitting, to a UE, one or more frames associated with an XR application during a downlink burst occasion and receiving pose information associated with the UE and the XR application during the downlink burst occasion.

A non-transitory computer-readable medium storing code for wireless communication at a base station is described. The code may include instructions executable by at least one processor to transmit, to a UE, one or more frames associated with an XR application during a downlink burst occasion and receive pose information associated with the UE and the XR application during the downlink burst occasion.

Some examples of the method, apparatuses, and non-transitory computer-readable medium described herein may further include operations, features, means, or instructions for transmitting, to the UE, a configuration to jointly transmit a subset of pose information of a set of pose information during the downlink burst occasion, where the subset of pose information includes two or more consecutive pose information.

In some examples of the method, apparatuses, and non-transitory computer-readable medium described herein, receiving the pose information may include operations, features, means, or instructions for receiving the subset of pose information jointly during the downlink burst occasion based on the configuration.

Some examples of the method, apparatuses, and non-transitory computer-readable medium described herein may further include operations, features, means, or instructions for assigning an uplink transmit rate or an uplink periodicity, or both, associated with the pose information, and including an indication of the uplink transmit rate or the uplink periodicity, or both, in the configuration.

DETAILED DESCRIPTION

Figure 1:
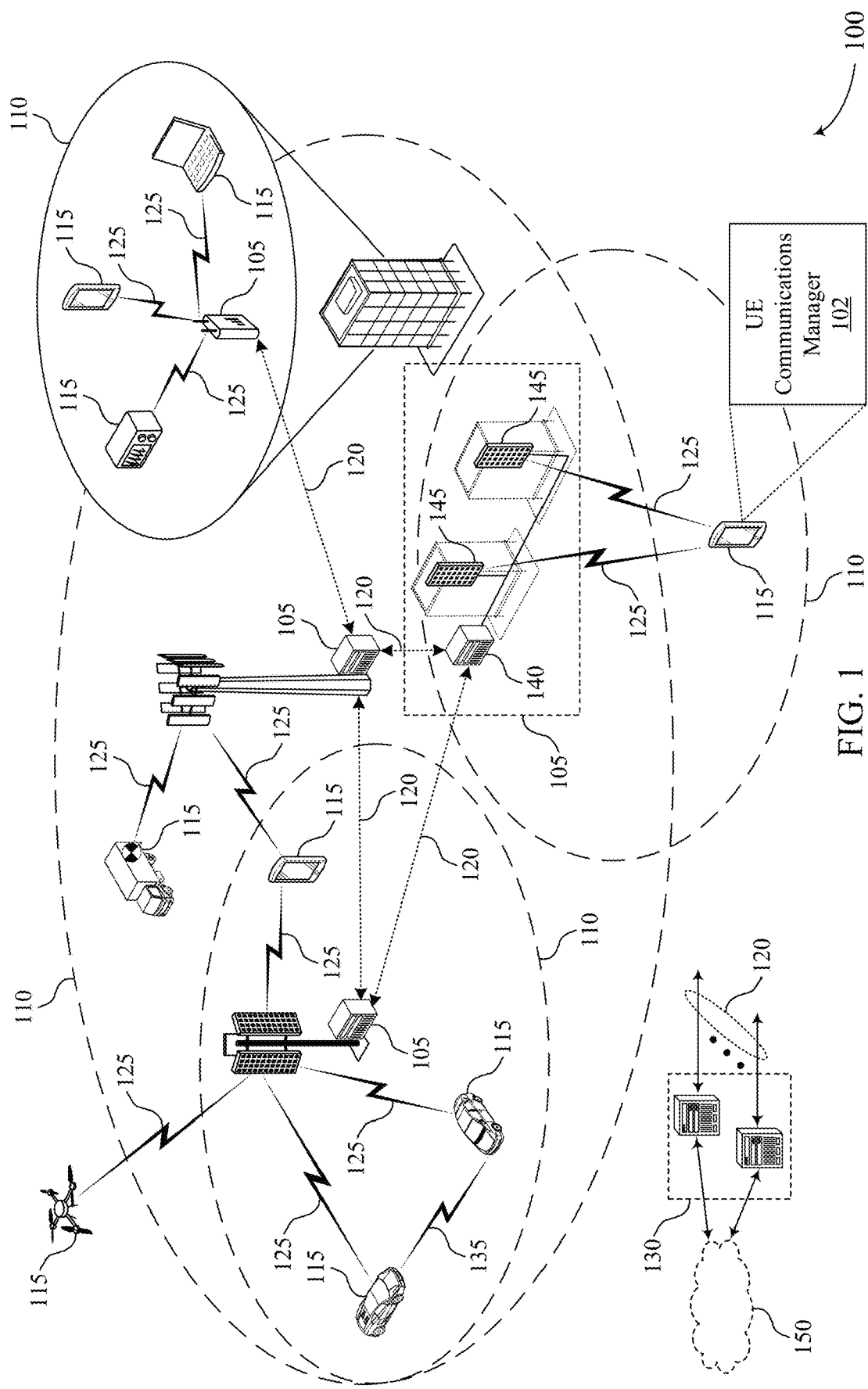
FIGS. 1 and 2 illustrate examples of wireless communications systems that support techniques for managing uplink transmissions for power saving in accordance with aspects of the present disclosure.

Some wireless communication systems may include communication devices, such as UEs and base stations, for example, eNBs, gNBs that may support multiple radio access technologies. Examples of radio access technologies include 4G systems such as LTE systems and 5G systems which may be referred to as NR systems. A UE may support various types of applications, such as XR applications, such as AR, MR, and VR, which may have periodic or semi-periodic data traffic. The applications may be hosted by a server as described herein. The server may transmit the periodic or semi-periodic data traffic to a base station, which may forward the data traffic to the UE. The base station may forward the data traffic to the UE using multiple transport blocks (also referred to as a burst of transport blocks).

For XR applications, features from the real and virtual environments may be overlaid and displayed to a user for consumption via the UE. To avoid visual conflicts, such as misaligning objects from the real and virtual environments, and other visual conflicts, the UE may sense, generate, and send pose information to a network (e.g., a server hosting the XR application). The pose information may define a position and orientation of the UE (or user) in space relative to the real and virtual environments. In some cases, transmission of the pose information by the UE may occur continuously and result in wasted power consumption. For example, the UE continuously transmits the pose information to the network without any mechanism to reduce power (e.g., enter a lower power mode) by decreasing or controlling pose information transmission.

Various aspects of the described techniques relate to configuring the UE to provide power saving improvements managing pose information transmission, as well as other control information transmission. For example, the UE may be configured to generate and transmit pose information when a downlink burst (e.g., a downlink frame transmission associated with an XR application) from the network is occurring. This allows an alignment between the uplink transmission (e.g., pose information transmission) and downlink reception (e.g., frame reception), which may reduce unnecessary wakeup periods and provides an opportunity for the UE to enter an extended sleep state. To support the alignment between the uplink transmission and the downlink reception, the UE may be configured to synchronize an uplink transmit rate with a downlink burst rate. The UE may also be configured to determine one or more slots relative to a downlink slot of the downlink burst for transmitting the pose information.

Aspects of the subject matter described in this disclosure may be implemented to realize one or more of the following potential improvements, among others. The techniques employed by the UE may provide benefits and enhancements to the operation of the UE. For example, operations performed by the UE may provide power saving improvements to the UE. In some examples, configuring the UE to reduce or control pose information transmission during a downlink burst occasion may reduce power consumption by the UE. In some other examples, configuring the UE to reduce or control pose information transmission during a downlink burst occasion may promote higher reliability and lower latency XR-related operations, among other benefits.

Aspects of the disclosure are initially described in the context of wireless communications systems. Aspects of the disclosure are further illustrated by and described with reference to apparatus diagrams, system diagrams, and flowcharts that relate to techniques for managing uplink transmissions for power saving.

FIG. 1 illustrates an example of a wireless communications system 100 that supports techniques for managing uplink transmissions for power saving in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNB, a gNB, a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode). A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as OFDM or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). The more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), or mMTC (massive MTC), and NB-IoT may include eNB-IoT (enhanced NB-IoT), or FeNB-IoT (further enhanced NB-IoT)

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

The base station 105 and the UE 115 may support various types of applications that may have periodic or semi-periodic data traffic. The base station 105 may be in wireless communication with a server (not shown), which may provide the periodic or semi-periodic data traffic to the base station 105 to forward to the UE 115. The server may be a cloud server, a server associated with an application subscription provider, proxy server, web server, application server, or any combination thereof. The server may include an application distribution platform. The application distribution platform may allow the UE 115 to discover, browse, share, and download applications via the base station 105, and therefore provide a digital distribution of the application from the application distribution platform. As such, a digital distribution may be a form of delivering content such as data, without the use of physical media but over online delivery mediums, such as the Internet. For example, the UE 115 may upload or download applications for streaming, downloading, uploading, or processing, data (e.g., images, audio, video). The server may also transmit to the UE 115 a variety of information, such as instructions or commands to download applications on the UE 115 via the base station 105.

By way of example, the base station 105 and the UE 115 may support XR applications, which may have periodic or semi-periodic XR data traffic. An XR application may support various frame rates, for example 60 MHz frame rates or 120 MHz frame rates. The server may generate an XR frame at 60 MHz, which may correspond to a periodicity of 16.67 ms. Alternatively, the server may generate an XR frame at 120 MHz, which may correspond to a periodicity of 8.33 ms. The server may transmit the periodic or semi-periodic XR data traffic to the base station 105, which may forward the XR data traffic to the UE 115. The server may divide the XR data traffic into multiple slices (also referred to as files) and encode each slice separately, and transmit the encoded slices to the base station 105, which may forward the XR data traffic to the UE 115 using multiple transport blocks (also referred to as a burst of transport blocks).

For XR applications features from the real and virtual environments may be overlaid and displayed to a user for consumption via the UE 115. To avoid visual conflicts, such as misaligning objects from the real and virtual environments, among other visual conflicts, the UE 115 may generate and send pose information to a network (e.g., a server hosting the XR application). The pose information may define a position and orientation of the UE 115 (or user) in space relative to the real and virtual environments. In some cases, different applications may have different uplink data flows.

For VR applications there may be a single uplink data flow. For example, the UE 115 may generate pose information (e.g., six degree of freedom (6DOF) pose information) and other control information. In some examples, the UE 115 may generate or transmit the pose information based at least in part on a data rate (e.g., 0.5-2 Mbps). The UE 115 may transmit the pose information and other control information based on an uplink transmit periodicity (e.g., 2 mn (500 Hz)). In some examples, the pose information and other control information may have different file sizes (e.g., 0.5 Mbit/500=1 Kbit=125 byte, 2 Mbit/500=4 Kbit=500 byte). A full delivery basic (FDB) may be 1.25 ms to 10 ms.

For AR applications there may be two uplink data flows. As part of the first uplink data flow, the UE 115 may generate pose information (e.g., 6DOF pose information) and other control information. The UE 115 may generate or transmit the pose information based at least in part on a data rate (e.g., 0.5-2 Mbps). The UE 115 may transmit the pose information and other control information based on an uplink transmit periodicity (e.g., 2 mn (500 Hz)). Similarly, for the AR applications, the FDB may be 1.25 ms to 10 ms. As part of the second uplink data flow, the UE 115 may generate pose information for a scene update associated with the AR applications. For scene updates, the UE 115 may generate or transmit the pose information based at least in part on a data rate (e.g., 10 Mbps at 10 Hz). In some examples, the pose information may have different file sizes (e.g., 1 Mbits per 100 ms=125 kbyte). An FDB may be 100 ms.

The UE 115 may benefit from the periodic or semi-periodic data traffic, and more specifically from the transmission delay between bursts of transport blocks carrying the periodic or semi-periodic data traffic to implement various operations to reduce power consumption. However, in some cases, transmission of the pose information by the UE 115 may occur too frequent and result in unnecessary added power consumption. Various aspects of the described techniques relate to configuring the UE 115 to provide power saving improvements managing pose information transmission, as well as other control information transmission. For example, a UE 115, via a UE communication manager 102, may be configured to generate and transmit pose information when a downlink burst (e.g., a downlink frame transmission associated with an XR application) from a base station 105 is occurring. This allows an alignment between the uplink transmission (e.g., pose information transmission) and downlink reception (e.g., frame reception), which may reduce unnecessary wakeup periods and provides an opportunity for the UE to enter an extended sleep state. To support the alignment between the uplink transmission and the downlink reception, the UE 115, via the UE communication manager 102, may be configured to synchronize an uplink transmit rate with a downlink burst rate. The UE 115 may also be configured to determine one or more slots relative to a downlink slot of the downlink burst for transmitting the pose information as described herein. The UE 115 may, as a result, include improvements to pose or other control information operations and, in some examples, may promote high reliability and low latency XR-related operations, among other benefits.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
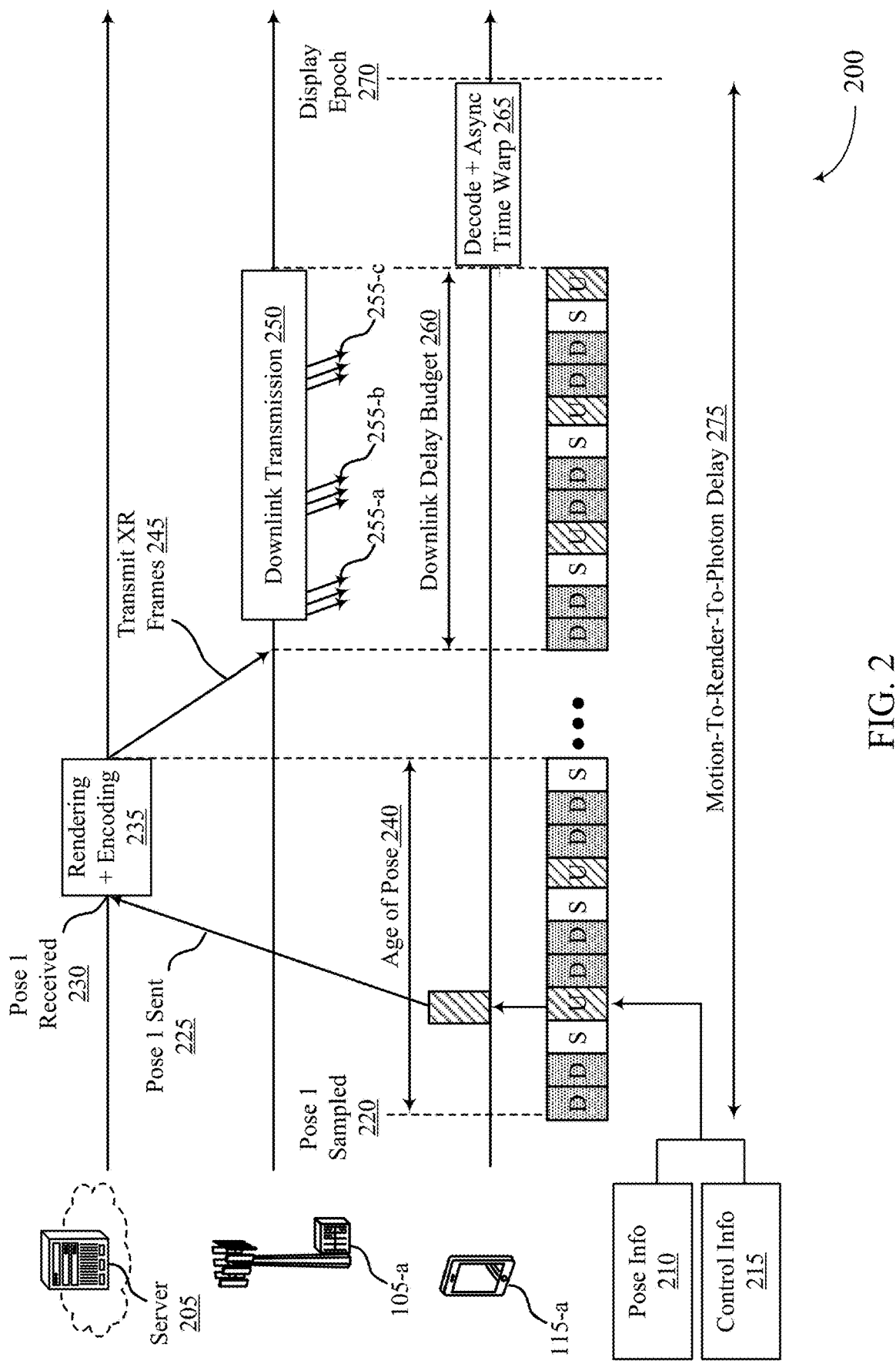

FIG. 2 illustrates an example of a wireless communications system 200 that supports techniques for managing uplink transmissions for power saving in accordance with aspects of the present disclosure. The wireless communications system 200 may implement aspects of the wireless communications system 100. For example, the wireless communications system 200 may include a base station 105-a and a UE 115-a, which may be examples of a base station 105 and a UE 115 as described herein. The wireless communications system 200 may also include a server 205, which may be examples of a server as described herein. The wireless communications system 200 may support multiple radio access technologies including 4G systems such as LTE systems, LTE-A systems, or LTE-A Pro systems, and 5G systems, which may be referred to as NR systems. The wireless communications system 200 may include features for improvements to power savings and, in some examples, may promote high reliability and low latency XR-related transmissions for power saving, among other benefits.

In the example of FIG. 2, the base station 105-a and the UE 115-a may support various types of applications that may have periodic or semi-periodic data traffic. The base station 105-a may be in wireless communication with the server 205, which may provide the periodic or semi-periodic data traffic to the base station 105-a to forward to the UE 115-a. The server 205 may be a cloud server, a server associated with an application subscription provider, proxy server, web server, application server, or any combination thereof. The server 205 may include an application distribution platform. The application distribution platform may allow the UE 115-a to discover, browse, share, and download applications via the base station 105-a, and therefore provide a digital distribution of the application from the application distribution platform. As such, a digital distribution may be a form of delivering content such as data, without the use of physical media but over online delivery mediums, such as the Internet. For example, the UE 115-a may upload or download applications for streaming, downloading, uploading, or processing, data (e.g., images, audio, video). The server 205 may also transmit to the UE 115-a a variety of information, such as instructions or commands to download applications on the UE 115-a via the base station 105-a.

By way of example, the base station 105-a and the UE 115-a may support XR applications, which may have periodic or semi-periodic XR data traffic. For XR-related applications, the UE 115-a may generate and send pose information 210, as well as other control information 215 to the server 205 (e.g., a server hosting the XR application) via the base station 105-a. The pose information 210 may define a pose, a posture, a position, an orientation, or a movement of the UE 115-a (or a user of the UE 115-a), and may be acquired via imaging devices including head-mounted units (HMUs), head-mounted displays (HMDs), external imaging devices, or any combination thereof. The pose information 210 may thereby include data regarding the freedom of movement of the UE 115-a (or the user), and may be characterized by six degrees of freedom in which a user/object may change position (e.g., translation upwards/downwards, translation left/right, translation forwards/backwards, pitch, yaw, roll). The control information 215 may refer to other inputs or commands input by a user, such as movement/commands with a joystick, controller, or other device. The UE 115-a may additionally acquire scene information. The scene information may include images and/or video of a surrounding physical or virtual environment, and may be acquired in the context of XR applications along with the pose information 210 or the control information 215, or both.

With reference to FIG. 2, the UE 115-a may, at 220, sample the pose information 210, the control information 215, the scene information, or any combination thereof. The UE 115 may thereby acquire information, at 230, which is to be transmitted to the server 205 and/or the base station 115-a. For example, the UE 115-a may sample Pose 1 at 230. In some examples, the pose information 210 and the control information 215 may be acquired (e.g., sampled) at a data rate of approximately 0.5-2 Mbps, and may be transmitted to the server 205 approximately every 2 ms (e.g., 500 Hz). Additionally, the pose information 210, the control information 215, or both, may be sampled and/or transmitted with a file size of 1 Kbit (e.g., 125 bytes), or 4 Kbit (e.g., 500 bytes). Comparatively, the scene information may be acquired (e.g., sampled) at a data rate of approximately 10 Mbps, and may be transmitted to the server 205 at a rate of 10 Hz. Additionally, the scene information may be sampled and/or transmitted with a file size of 1 Mbits per 100 ms (e.g., 125 Kbytes).

At 225, the UE 115-a may transmit the sampled information (transmit Pose 1) to the server 205. In some aspects, the UE 115-a may transmit the sampled information within the first uplink symbol following the time in which the information (e.g., the pose information 210, the control information 215, scene information) was sampled. At 230, the sampled information may be received at the server 205. At 235, the server 205 may render and encode a new XR frame based on (e.g., according to) the received information (Pose 1). In some aspects, XR frames may be generated periodically, and may be divided into multiple slices that are encoded separately. As shown in FIG. 2, the age of acquired information (e.g., age of pose 240) may be defined as the duration between when the information was sampled (e.g., Pose 1 sampled at 220) and when the XR is rendered and/or encoded at the server 205.

At 245, the XR frame may be transmitted to the base station 105-a. In some aspects, each encoded slide (of file) of the XR frame may be transmitted from the server 205 to the base station 105-a separately. At 250, the base station 105-a may transmit the received XR frames to the UE 115-a. In some aspects, the slices of the XR frame may be transmitted through multiple transport blocks, or a burst of transport blocks, to the UE 115-a. For example, as will be discussed in further detail herein with respect to FIG. 3, the base station 105-a may transmit data to the UE 115-a via XR frame bursts 255 (e.g., first XR frame burst 255-a, second XR frame burst 255-b, and third XR frame burst 255-c). Each XR frame burst 255 may have a transmission delay requirement, and the downlink transmission from the base station 105-a to the UE 115-a may be characterized by a downlink delay budget 260. At 265, the UE 115-a may decode the data received from the base station 105-a (e.g., decode XR frame bursts 255) and perform asynchronous time warp procedures. Subsequently, at 270, the received XR frames may be displayed at the UE 115-a. The example of FIG. 2 may depict a delay (e.g., a motion-to-render-to-photon delay 275) from motion to rendering to photon.

The transmission of the pose information 210 by the UE 115-a, in some cases, may occur continuously and result in wasted power consumption. For example, the UE 115-a continuously transmits the pose information 210 to the server 205 and/or the base station 105-a without any mechanism to reduce power (e.g., enter a lower power mode) by decreasing or controlling pose information 210 transmission. In the wireless communications system 200, the UE 115-a may be configured to provide power saving improvements by managing pose information transmission, as well as other control information transmission. For example, the UE 115-a may be configured to generate and transmit pose information 210 when an XR frame burst (also referred to as a downlink burst) (e.g., a downlink frame transmission associated with an XR application) from the server 205 and/or the base station 105-a is occurring. This allows an alignment between the uplink transmission (e.g., pose information transmission) and downlink reception (e.g., frame reception), which may reduce unnecessary wakeup periods and provides an opportunity for the UE 115-a to enter an extended sleep state. To support the alignment between the uplink transmission and the downlink reception, the UE 115-a may be configured to synchronize an uplink transmit rate with a XR frame burst rate. The UE 115-a may also be configured to determine one or more slots relative to a downlink slot of the XR frame burst for transmitting the pose information. Other advantages of the present disclosure will be described in further detail herein with respect to FIGS. 3-9.

Figure 3:
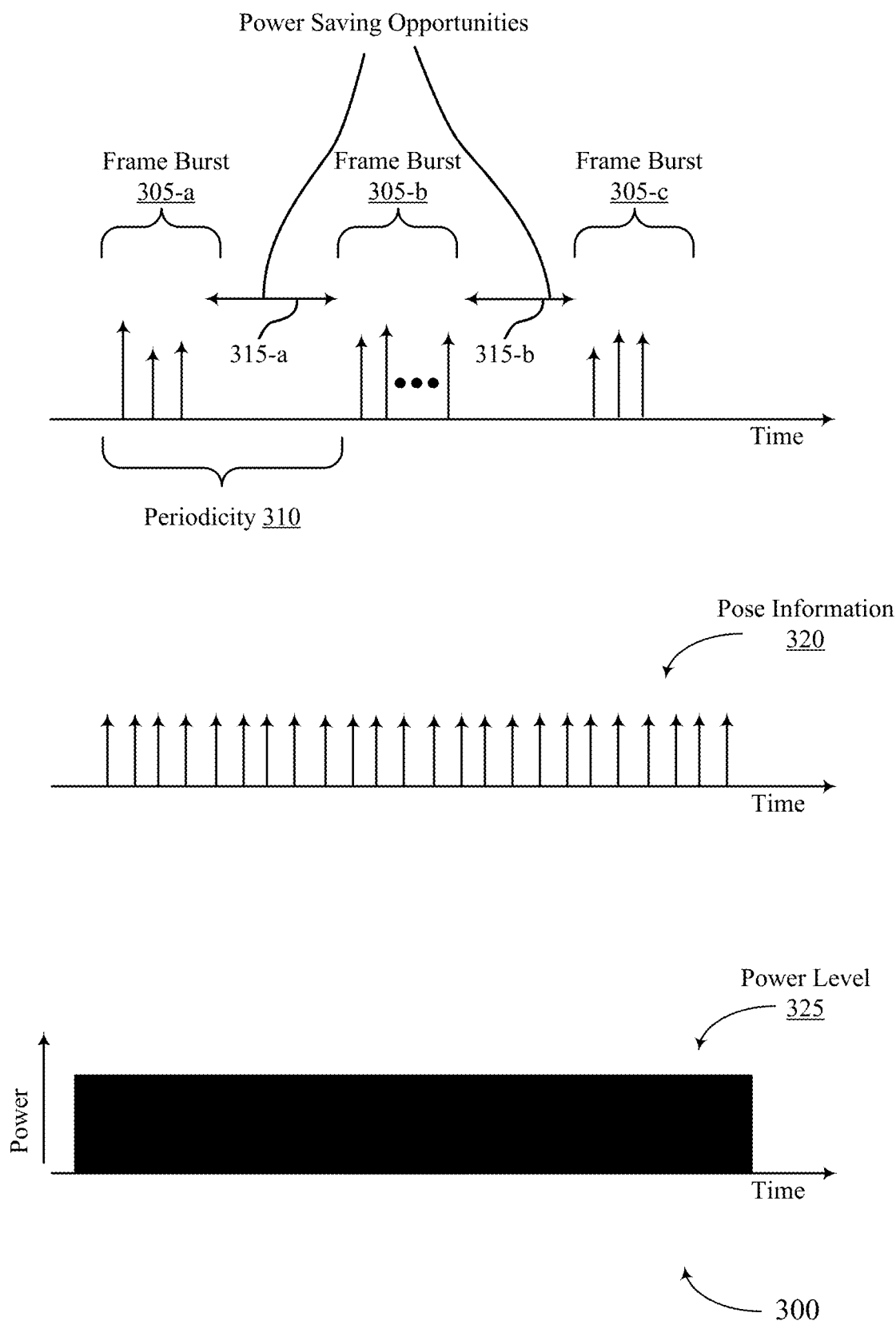
FIGS. 3 through 6 illustrate examples of downlink and uplink configurations that support techniques for managing uplink transmissions for power saving in accordance with aspects of the present disclosure.

FIG. 3 illustrates an example of a downlink and uplink configuration 300 that supports techniques for managing uplink transmissions for power saving in accordance with aspects of the present disclosure. The downlink and uplink configuration 300 may implement or may be implemented by aspects of the wireless communications systems 100 and 200 as described with reference to FIGS. 1 and 2. respectively. The downlink and uplink configuration 300 may be based on a configuration by a base station 105, and implemented by a UE 115. The downlink and uplink configuration 300 may configure time resources (e.g., symbols, minislots, slots) as well as frequency resources (e.g., carriers, subcarriers). The downlink and uplink configuration 300 may support multiple radio access technologies including 4G systems such as LTE systems, LTE-A systems, or LTE-A Pro systems, and 5G systems which may be referred to as NR systems.

The base station 105 may transmit, and the UE 115 may receive, one or more frame bursts 305 carrying one or more frames associated with an application. For example, the base station 105 may transmit, and the UE 115 may receive, one or more XR frame bursts carrying one or more XR frames associated with an XR application. A frame may be divided into multiple slices that may be separately encoded. The base station 105 may transmit the encoded slices over the air through multiple transport blocks (a burst of transport blocks). In some examples, the base station 105 may transmit the frame bursts 305 according to a periodicity 310 (e.g., a frame generation periodicity), which may be based on a frame rate of an application, such as an XR application (e.g., a 60 Hz or 120 Hz frame rate, which provides a frame generation periodicity of 16.67 ms or 8.33 ms, respectively). The UE 115 may thereby receive the frame bursts 305 based on the periodicity 310. In the example of FIG. 3, there may be one or more power saving opportunities 315 between the frame bursts 305 for the UE 115 to experience added power savings.

The UE 115 may determine one or more power saving opportunities 315 between the frame bursts 305 based at least in part on the periodicity 310. For example, the UE 115 may determine a power saving opportunity 315-*a* between two consecutive frame bursts (e.g., the frame burst 305-*a* and the frame burst 305-*b*). Additionally or alternatively, the UE 115 may determine a power saving opportunity 315-*b* between two other consecutive frame bursts (e.g., the frame burst 305-*b* and the frame burst 305-*c*). In some cases, however, the UE 115 may be unable to experience added power savings associated with the one or more power saving opportunities 315 because transmission of pose information 320 by the UE 115 may occur continuously, which may result in wasted power consumption. For example, the UE continuously transmits the pose information 210 to the base station 105 without any mechanism to decrease a power level 325 in dBm by reducing or controlling the pose information 210 transmission. As a result, the one or more power saving opportunities 315 between the frame bursts 305 is unused.

Figure 4:
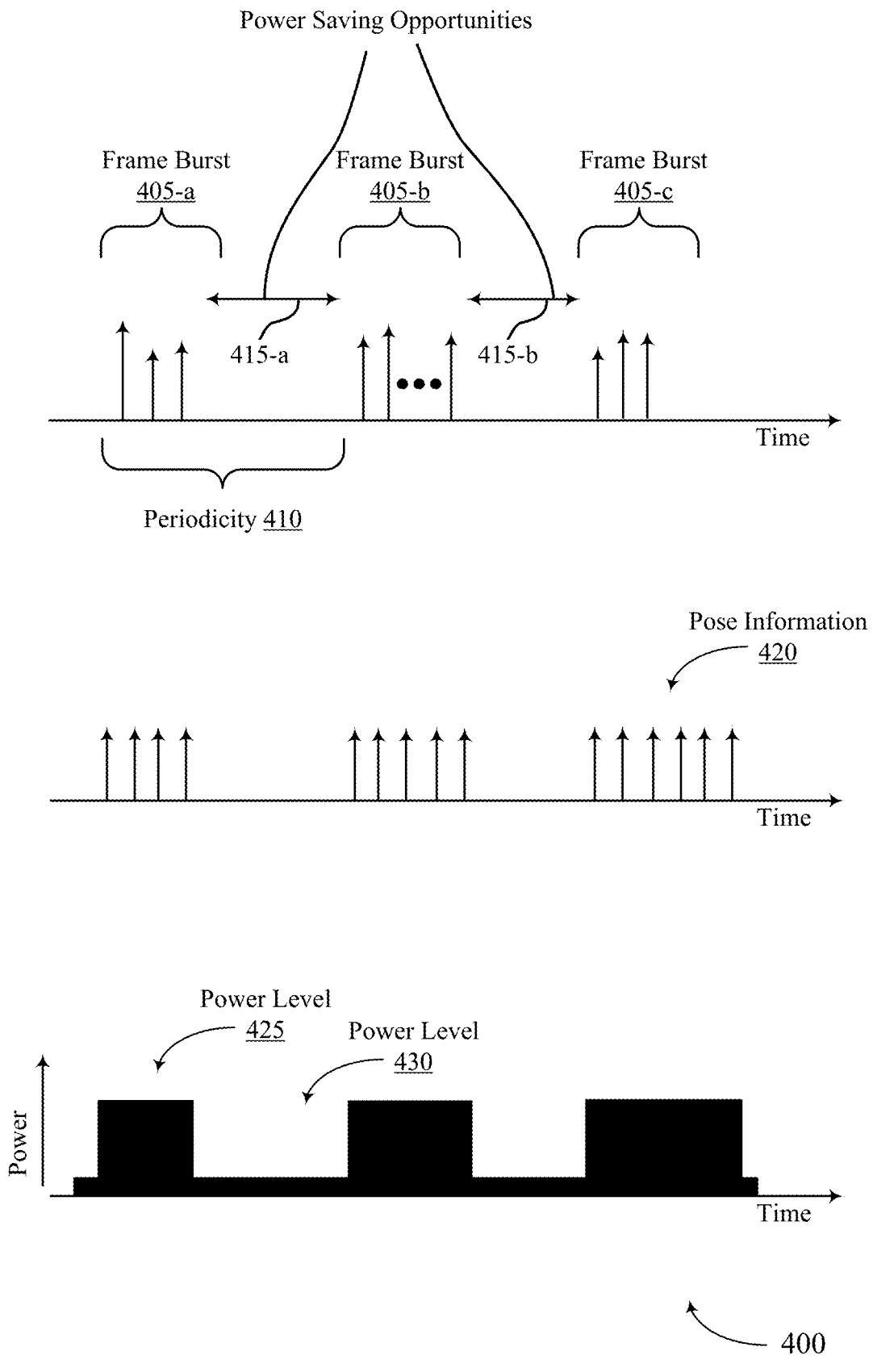

FIG. 4 illustrates an example of a downlink and uplink configuration 400 that supports techniques for managing uplink transmissions for power saving in accordance with aspects of the present disclosure. The downlink and uplink configuration 400 may implement or may be implemented by aspects of the wireless communications systems 100 and 200 as described with reference to FIGS. 1 and 2. respectively. The downlink and uplink configuration 400 may be based on a configuration by a base station 105, and implemented by a UE 115. The downlink and uplink configuration 400 may configure time resources (e.g., symbols, minislots, slots) as well as frequency resources (e.g., carriers, subcarriers) for downlink and uplink transmissions. The downlink and uplink configuration 400 may support multiple radio access technologies including 4G systems and 5G systems.

The base station 105 may transmit, and the UE 115 may receive, one or more frame bursts 405 carrying one or more frames associated with an application. For example, the base station 105 may transmit, and the UE 115 may receive, one or more XR frame bursts carrying one or more XR frames associated with an XR application (e.g., an AR application or a VR application). As described herein, a frame may be divided into multiple slices that may be separately encoded. The base station 105 may transmit the encoded slices over a channel (e.g., a physical downlink control channel (PDCCH), a physical downlink shared channel (PDSCH)) through multiple transport blocks (a burst of transport blocks). In some examples, the base station 105 may transmit, and the UE 115 may receive, the frame bursts 405 according to a periodicity 410 (e.g., a frame generation periodicity), which may be based on a frame rate of an application, such as an AR application or a VR application (e.g., a 60 Hz or 120 Hz frame rate, which provides a frame generation periodicity of 16.67 ms or 8.33 ms, respectively).

In the example of FIG. 4, one or more power saving opportunities 415 may occur between at least two frame bursts 405. These power saving opportunities 415 may provide added power savings for the UE 115. In some examples, the UE 115 may determine one or more power saving opportunities 415 between the frame bursts 405 based at least in part on the periodicity 410 associated with the base station 105. For example, the UE 115 may determine a power saving opportunity 415-*a* between two consecutive frame bursts (e.g., the frame burst 405-*a* and the frame burst 405-*b*). Additionally or alternatively, the UE 115 may determine a power saving opportunity 415-*b* between two other consecutive frame bursts (e.g., the frame burst 405-*b* and the frame burst 405-*c*). To experience benefits of the one or more power saving opportunities 415, the UE 115 may be configured to transmit pose information 420 and/or other control information associated with an application (e.g., an XR application) only during a frame burst 405.

For example, the UE 115 may transmit pose information 420 and/or other control information during a frame burst 405-*a*, a frame burst 405-*b*, or a frame burst 405-*c*, or any combination thereof. The UE 115 may refrain from transmitting the pose information 420 and/or other control information during the power saving opportunity 415-*a* or the power saving opportunity 415-*b*, or both. In the example of FIG. 4, an uplink transmit rate associated with the pose information 420 is greater than or equal to a downlink transmit rate associated with the frame burst 405 to achieve timing alignment between uplink transmission (e.g., pose information 420 transmission) and downlink reception (e.g., frame burst 405 reception). The downlink transmit rate corresponds to a number of frame transmissions per second. The uplink transmit rate corresponds to a number of pose information transmissions per second. The downlink and uplink configuration 400 provide the UE 115 with power saving by decreasing a power level, for example, from a first power level 425 to a second power level 430 during power saving opportunities 415. The downlink and uplink configuration 400 may also provide the UE 115 with an occasion to remain in an extended sleep mode (e.g., a low power mode).

Figure 5:
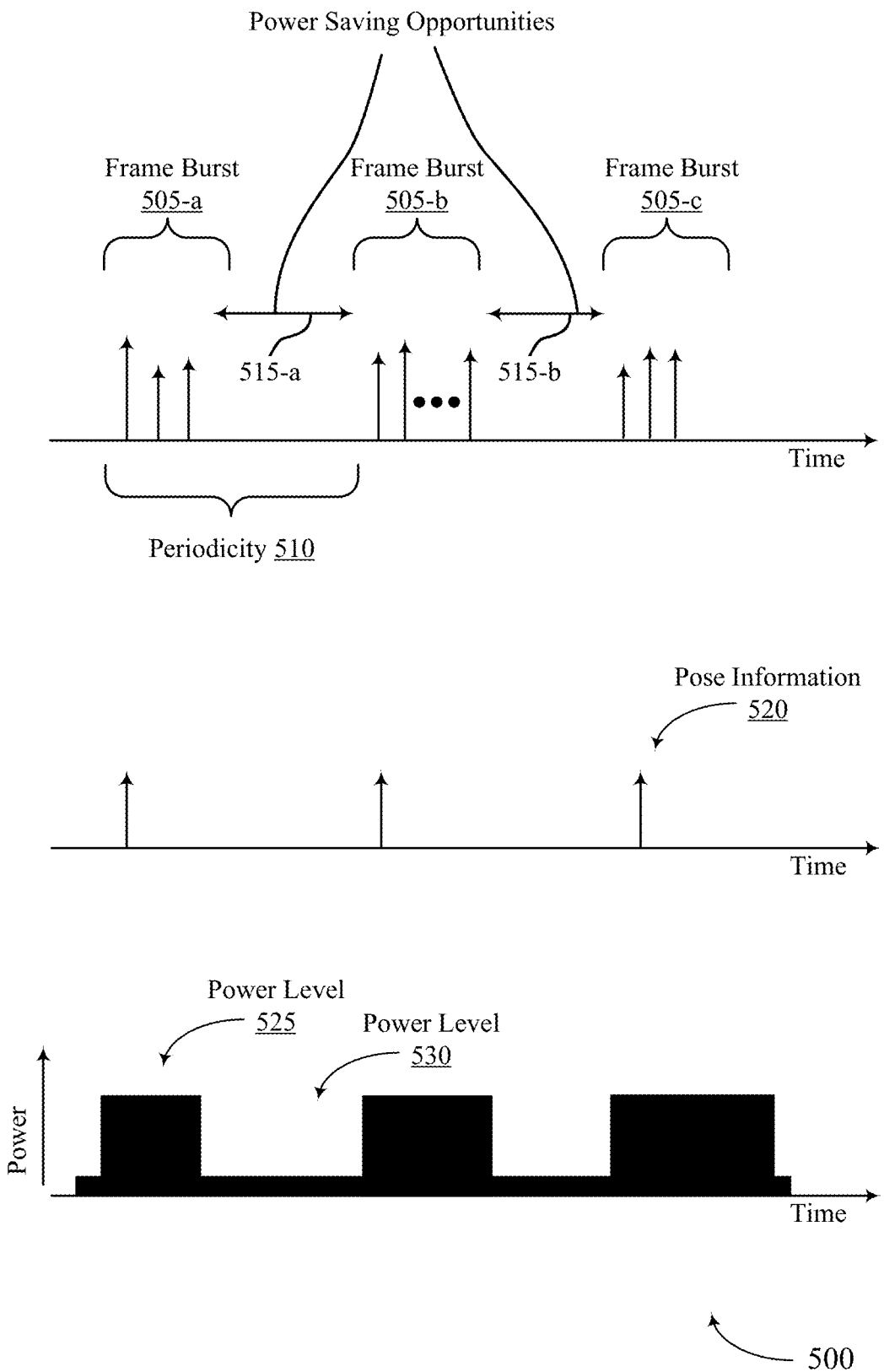

FIG. 5 illustrates an example of a downlink and uplink configuration 500 that supports techniques for managing uplink transmissions for power saving in accordance with aspects of the present disclosure. The downlink and uplink configuration 500 may implement or may be implemented by aspects of the wireless communications systems 100 and 200 as described with reference to FIGS. 1 and 2. respectively. The downlink and uplink configuration 500 may be based on a configuration by a base station 105, and implemented by a UE 115. The downlink and uplink configuration 500 may configure time resources (e.g., symbols, minislots, slots) as well as frequency resources (e.g., carriers, subcarriers) for downlink and uplink transmissions. The downlink and uplink configuration 500 may support multiple radio access technologies including 4G systems and 5G systems.

The base station 105 may transmit, and the UE 115 may receive, one or more frame bursts 505 carrying one or more frames associated with an application. For example, the base station 105 may transmit, and the UE 115 may receive, one or more XR frame bursts carrying one or more XR frames associated with an XR application. In some examples, the base station 105 may transmit, and the UE 115 may receive, the frame bursts 505 according to a periodicity 510 (e.g., a frame generation periodicity), which may be based on a frame rate of an application, such as an XR application (e.g., a 60 Hz or 120 Hz frame rate, which provides a frame generation periodicity of 16.67 ms or 8.33 ms, respectively).

One or more power saving opportunities 515 may occur between at least two frame bursts 505. For example, the UE 115 may determine a power saving opportunity 515-$a$ between two consecutive frame bursts (e.g., the frame burst 505-$a$ and the frame burst 505-$b$). Additionally or alternatively, the UE 115 may determine a power saving opportunity 515-$b$ between two other consecutive frame bursts (e.g., the frame burst 505-$b$ and the frame burst 505-$c$). These power saving opportunities 515 may provide added power savings for the UE 115. In the example of FIG. 5, to experience benefits of the one or more power saving opportunities 515, the UE 115 may be configured to transmit pose information 520 and/or other control information associated with an application (e.g., an XR application) only once during a frame burst 505. The UE 115 may adjust an uplink transmit rate associated with the pose information 520 based at least in part on a downlink transmit rate associated with the frame bursts 505. For example, the UE 115 may decrease the uplink transmit rate to match the downlink transmit rate.

The UE 115 may additionally, or alternatively, adjust an uplink pose generation rate associated with the pose information 520, for example, based at least in part on the adjusted uplink transmit rate. The UE 115 may adjust the uplink pose generation rate because uplink transmission (e.g., associated with the pose information 520) can consume significant amount of power especially when the UE 115 is located at cell edge of the base station 105 or in a low geometry condition. In some examples, the UE 115 may reduce its pose information generation rate to the downlink frame generation rate. As such, the adjusted uplink pose generation rate matches a downlink frame generation rate associated with the frame burst 505.

Therefore, the UE 115 may transmit pose information 520 and/or other control information once during a frame burst 505-$a$, a frame burst 505-$b$, or a frame burst 505-$c$, or any combination thereof. The UE 115 may refrain from transmitting the pose information 520 and/or other control information during the power saving opportunity 515-$a$ or the power saving opportunity 515-$b$, or both. The downlink and uplink configuration 500 provide the UE 115 with power saving by decreasing a power level, for example, from a first power level 525 to a second power level 530 during power saving opportunities 515. The downlink and uplink configuration 500 may also provide the UE 115 with an occasion to remain in an extended sleep mode (e.g., a low power mode).

Figure 6:
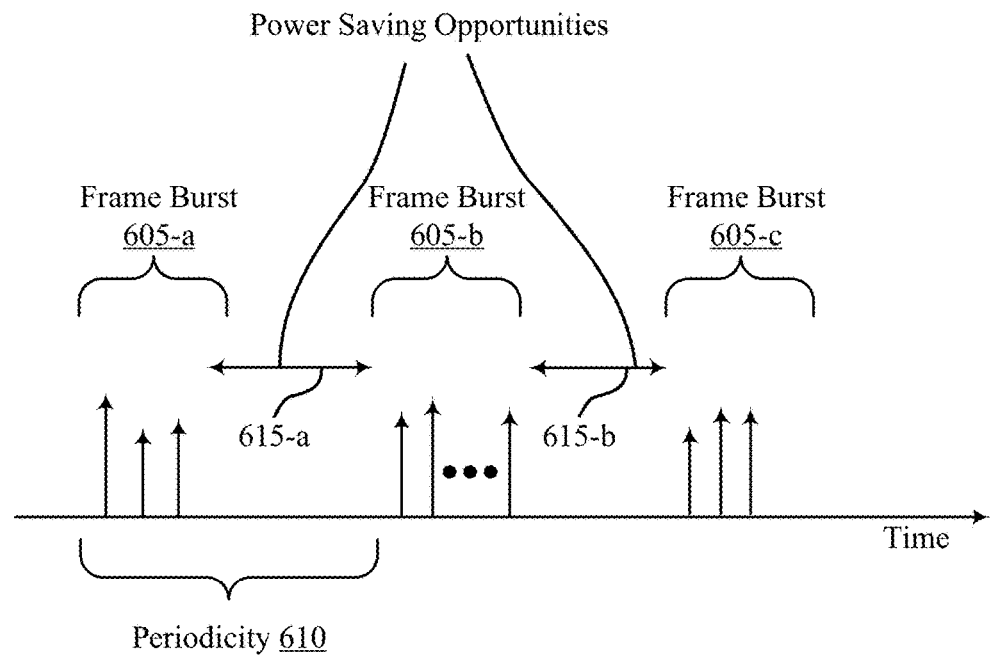
Figure 6:
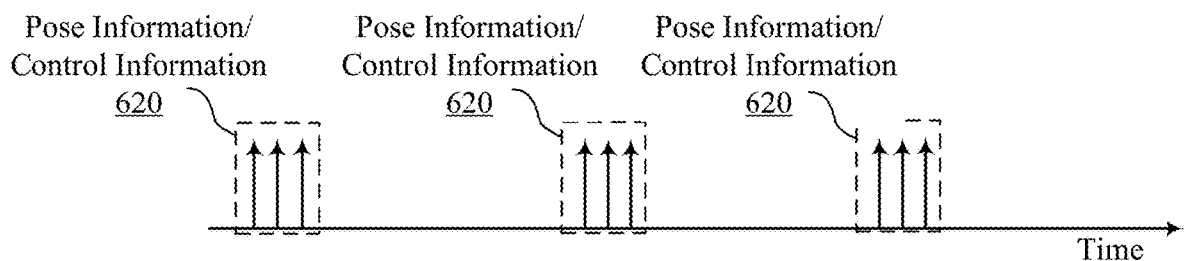
Figure 6:
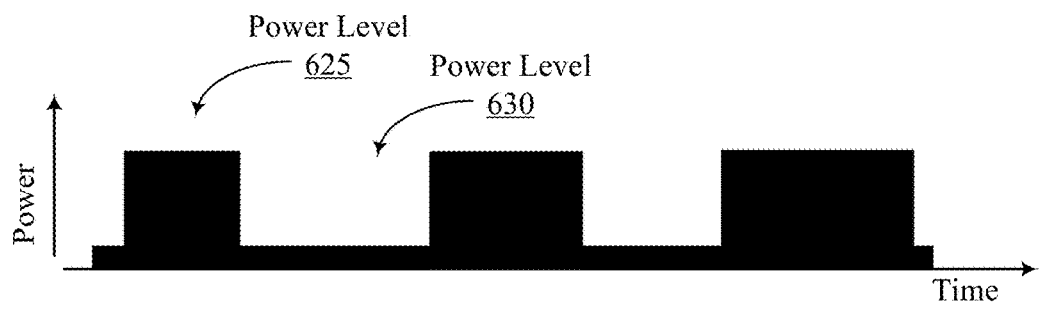

FIG. 6 illustrates an example of a downlink and uplink configuration 600 that supports techniques for managing uplink transmissions for power saving in accordance with aspects of the present disclosure. The downlink and uplink configuration 600 may implement or may be implemented by aspects of the wireless communications systems 100 and 200 as described with reference to FIGS. 1 and 2. respectively. The downlink and uplink configuration 600 may be based on a configuration by a base station 105, and implemented by a UE 115. The downlink and uplink configuration 600 may configure time resources (e.g., symbols, minislots, slots) as well as frequency resources (e.g., carriers, subcarriers) for downlink and uplink transmissions. The downlink and uplink configuration 600 may support multiple radio access technologies including 4G systems and 5G systems.

The base station 105 may transmit, and the UE 115 may receive, one or more frame bursts 605 carrying one or more frames associated with an application. For example, the base station 105 may transmit, and the UE 115 may receive, one or more XR frame bursts carrying one or more XR frames associated with an XR application. In some examples, the base station 105 may transmit, and the UE 115 may receive, the frame bursts 605 according to a periodicity 610 (e.g., a frame generation periodicity), which may be based on a frame rate of an application, such as an XR application. One or more power saving opportunities 615 may occur between at least two frame bursts 605. For example, the UE 115 may determine a power saving opportunity 615-$a$ between two frame bursts (e.g., the frame burst 605-$a$ and the frame burst 605-$b$). Additionally or alternatively, the UE 115 may determine a power saving opportunity 615-$b$ between two other frame bursts (e.g., the frame burst 605-$b$ and the frame burst 605-$c$). These power saving opportunities 615 may provide extra power savings for the UE 115.

In the example of FIG. 6, to experience benefits of the one or more power saving opportunities 615, the UE 115 may be configured to generate and combine a number of consecutive generated pose and/or control information 620, and transmit the combined number of consecutive pose and/or control information 620 only once during a frame burst 605. In some examples, the UE 115 may transmit the combined number of consecutive pose and/or control information 620 only once during a frame burst 605 at a reduced rate. If the uplink transmit rate associated with the pose and/or control information is reduced (e.g., from 500 Hz to 60 Hz), then the base station 105 may be configured with a pose prediction algorithm to improve pose predication at the time that a new frame is rendered. In some examples, the base station 105 may configured the UE 115 to transmit the combined number of consecutive pose and/or control information 620 at a particular uplink transmit rate or a particular uplink periodicity. For instance, in the example of FIG. 6, the UE 115 may be configured to combine at least three consecutive generated pose and/or control information 620 and transmit it at 60 Hz (or periodicity of 16.67 ms).

Therefore, the UE 115 may transmit a combined number of consecutive pose and/or control information 620 once during a frame burst 605-$a$, a frame burst 605-$b$, or a frame burst 605-$c$, or any combination thereof. The UE 115 may refrain from transmitting the combined number of consecutive pose and/or control information 620 during the power saving opportunity 615-$a$ or the power saving opportunity 615-$b$, or both. The downlink and uplink configuration 600 provide the UE 115 with power saving by decreasing a power level, for example, from a first power level 625 to a second power level 630 during power saving opportunities 615. The downlink and uplink configuration 600 may also provide the UE 115 with an occasion to remain in an extended sleep mode (e.g., a low power mode). In some examples, the UE 115 may also be configured to enable a timer based on the one or more frame bursts 605. For example, the UE 115 may switch from a first power mode to a second power mode based at least in part on the enabled timer, and switch back to the first power mode based on the timer lapsing.

Figure 7:
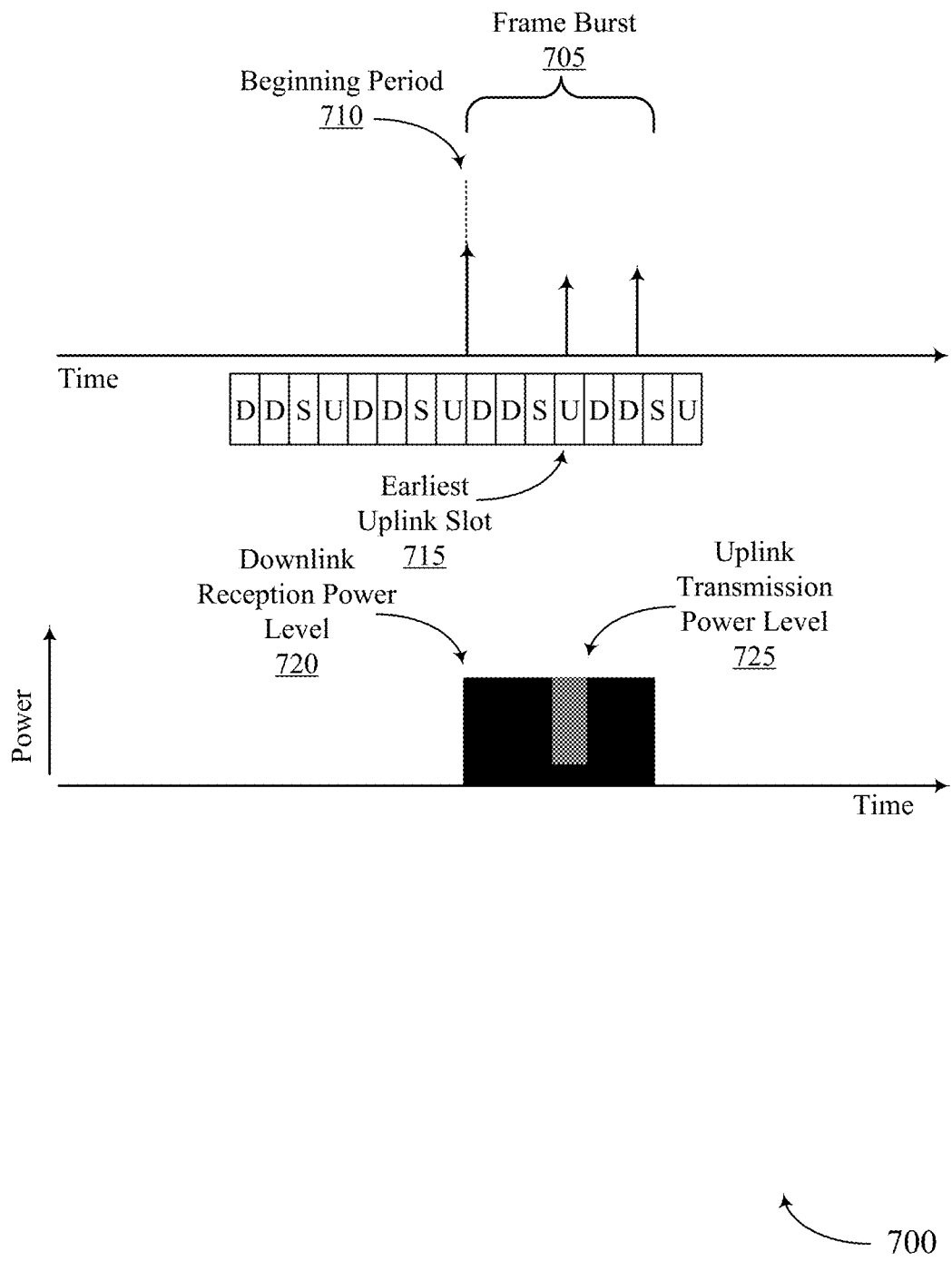
FIGS. 7 and 8 illustrate examples of downlink and uplink slot format that support techniques for managing uplink transmissions for power saving in accordance with aspects of the present disclosure.

FIG. 7 illustrates an example of a downlink and uplink slot format 700 that supports techniques for managing uplink transmissions for power saving in accordance with aspects of the present disclosure. The downlink and uplink slot format 700 may implement or may be implemented by aspects of the wireless communications systems 100 and 200 as described with reference to FIGS. 1 and 2. respectively. The downlink and uplink slot format 700 may be based on a configuration by a base station 105, and implemented by a UE 115. The downlink and uplink slot format 700 may configure time resources (e.g., symbols, minislots, slots) as well as frequency resources (e.g., carriers, subcarriers) for downlink and uplink transmissions. The downlink and uplink slot format 700 may support multiple radio access technologies including 4G systems and 5G systems.

The base station 105 may transmit, and the UE 115 may receive, at least one frame burst 705 carrying one or more frames associated with an application. For example, the base station 105 may transmit, and the UE 115 may receive, at least one XR frame burst carrying one or more XR frames associated with an XR application. In the example of FIG. 7, to achieve power saving benefits, the UE 115 may be configured to determine a beginning period 710 associated with an earliest transport block transmission of one or more transport blocks transmissions associated with the frame burst 705. That is, the UE 115 may determine a most recent (or current) frame burst start time. This may correspond to a most recent downlink transmission (of the frame burst 705) arrival time, which may correspond to an earliest downlink slot associated with the frame burst 705 in the downlink and uplink slot format 700.

In some examples, to increase a probability of overlap between downlink and uplink transmissions (which minimizes the UE 115 awake time), the UE 115 may begin uplink transmissions in the earliest slot after the most recent (or current) frame burst start time. For example, the UE 115 may determine an earliest uplink slot 715 following the beginning period associated with the earliest transport block transmission of the frame burst 705. The UE 115 may transmit, to the base station 105, pose and/or control information in the earliest uplink slot 715. In some examples, the beginning period 710 associated with the earliest transport block transmission of the frame burst 705 may correspond to a beginning of an active DRX duration (e.g., a DRX ON duration). The active DRX duration may also be configured to be aligned with an expected beginning period (e.g., the beginning period 710) of the earliest transport block transmission of the frame burst 705. In some examples, the beginning period 710 (e.g., a downlink burst start time) may be determined as the earliest downlink slot where a current burst (e.g., the frame burst 705) is started to be received at the UE 115. In some cases, the first slot where a downlink frame associated with the frame burst 705 arrives at the UE 115 could change depending on the jitter or encoding delay.

Therefore, the UE 115 may be configured to determine an uplink slot to transmit pose and/or control information during the frame burst 705. By controlling a power level, for example, a downlink reception power level 720 and an uplink transmission power level 725 during a power saving opportunity associated with the frame burst 705, the UE 115 may experience added power saving.

Figure 8:
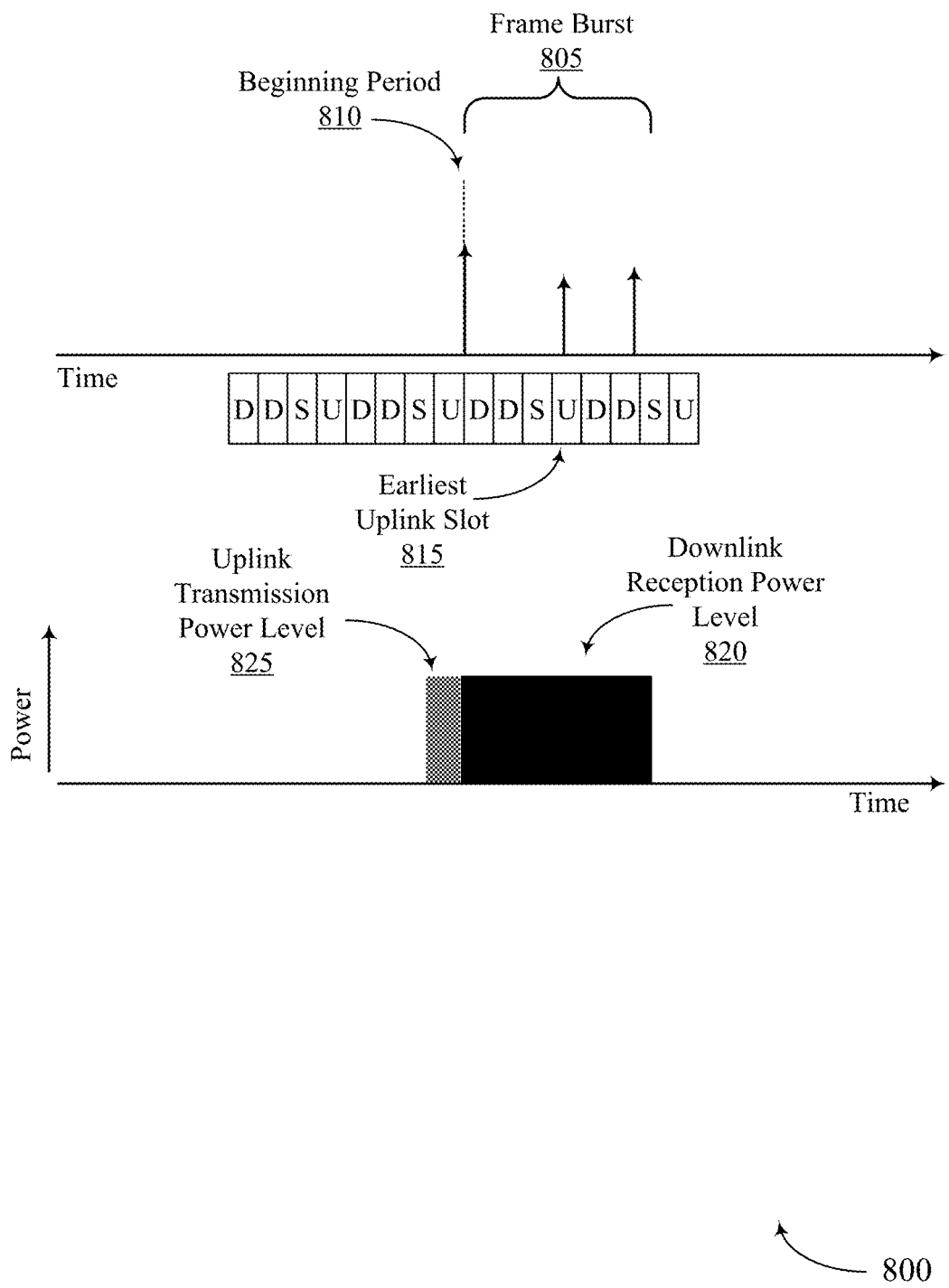

FIG. 8 illustrates an example of a downlink and uplink slot format 800 that supports techniques for managing uplink transmissions for power saving in accordance with aspects of the present disclosure. The downlink and uplink slot format 800 may implement or may be implemented by aspects of the wireless communications systems 100 and 200 as described with reference to FIGS. 1 and 2. respectively. The downlink and uplink slot format 800 may be based on a configuration by a base station 105, and implemented by a UE 115. The downlink and uplink slot format 800 may configure time resources (e.g., symbols, minislots, slots) as well as frequency resources (e.g., carriers, subcarriers) for downlink and uplink transmissions. The downlink and uplink slot format 800 may support multiple radio access technologies including 4G systems and 5G systems.

The base station 105 may transmit, and the UE 115 may receive, at least one frame burst 805 carrying one or more frames associated with an application. For example, the base station 105 may transmit, and the UE 115 may receive, at least one XR frame burst carrying one or more XR frames associated with an XR application. In the example of FIG. 8, to achieve power saving benefits, the UE 115 may be configured to determine one or more uplink slots (e.g., earliest uplink slot 815) preceding an earliest downlink slot associated with an earliest transport block transmission (that may begin at beginning period 810) of one or more transport block transmissions associated with the frame burst 805. The UE 115 may be configured to transmit, to the base station 105, pose and/or control information during the one or more uplink slots preceding the earliest downlink slot associated with the earliest transport block transmission.

In some examples, the UE 115 may transmit the pose and/or control information in the one or more uplink slots based at least in part on satisfying a slot window threshold. That is, if there are one or more preceding uplink slots within a time window before the most recent (current) downlink slot, then the UE 115 may transmit pose and/or control information in the one or more preceding uplink slots. The slot window threshold may be configurable. For example, the slot window threshold may be 1 or 2 slots (or 0.5, 1, or 2 ms). This could ensure uplink and downlink transmission be back-to-back, which can reduce power consumption for the UE 115. Therefore, the UE 115 may be configured control a power level, for example, a downlink reception power level 820 and an uplink transmission power level 825 during a power saving opportunity associated with the frame burst 805, to experience added power saving.

Figure 9:
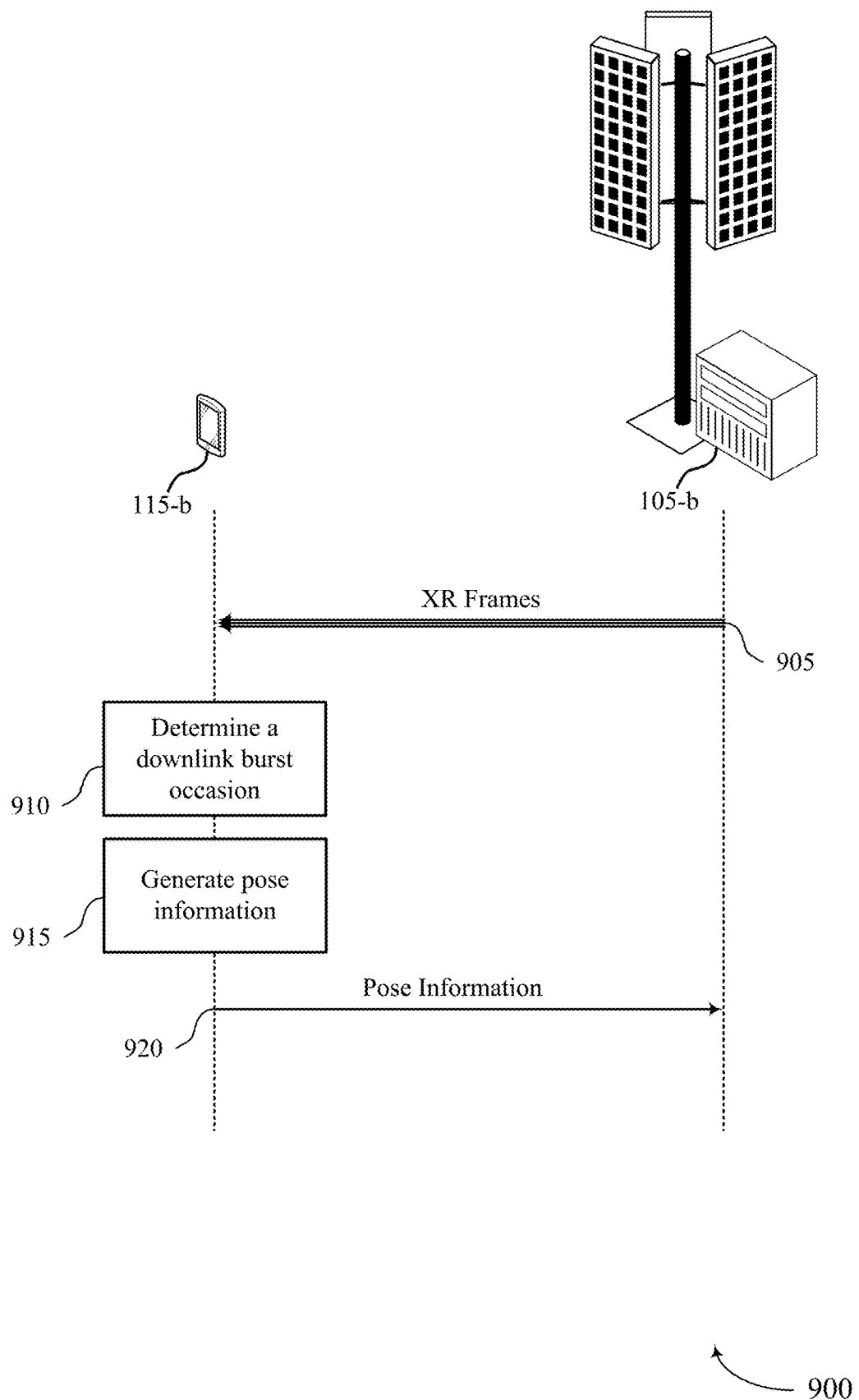
FIG. 9 illustrates an example of a process flow that supports techniques for managing uplink transmissions for power saving in accordance with aspects of the present disclosure.

FIG. 9 illustrates an example of a process flow 900 that supports techniques for managing uplink transmissions for power saving in accordance with aspects of the present disclosure. The process flow 900 may implement aspects of the wireless communications system 100 and the wireless communications system 200 described with reference to FIGS. 1 and 2, respectively. The process flow 900 may be based on a configuration by a base station 105-b and implemented by a UE 115-b to promote power saving for the UE 115-b (e.g., entering a low power mode) by managing transmission of pose information during a downlink burst occasion. The process flow 900 may also be based on a configuration by the base station 105-b and implemented by the UE 115-b to promote high reliability and low latency XR-related operations (e.g., determine a position and orientation of the UE 115-b (or user) in space relative to the real and virtual environments), among other benefits.

In the following description of the process flow 900, the operations between the base station 105-b and the UE 115-b may be transmitted in a different order than the example order shown, or the operations performed by the base station 105-b and the UE 115-b may be performed in different orders or at different times. Some operations may also be omitted from the process flow 900, and other operations may be added to the process flow 900. The base station 105-b and the UE 115-b may be examples of a base station 105 and a UE 115 as described with reference to FIGS. 1 and 2, respectively.

At 905, the base station 105-b may transmit, to the UE 115-b, one or more XR frames associated with an XR application, for example, during a downlink burst occasion. At 910, the UE 115-b may determine a downlink burst occasion for the XR application, and receive, from the base station 105-b, the one or more XR frames associated with the XR application. At 915, the UE 115-b may generate pose information. For example, the UE 115-b may generate pose information associated with the UE 115-b and the XR application. At 920, the UE 115-b may transmit the pose information to the base station 105-b, during the downlink burst occasion. In some examples, the UE 115-b may enable a timer (e.g., an activity timer, an inactivity timer) based at least in part on the downlink burst occasion, and the UE 115-b may switch from a first operating state to a second operating state based at least in part on the enabled timer. In some cases, the first operating state corresponds to a first power level that is lower than a second power level associated with the second operating state.

Figure 10:
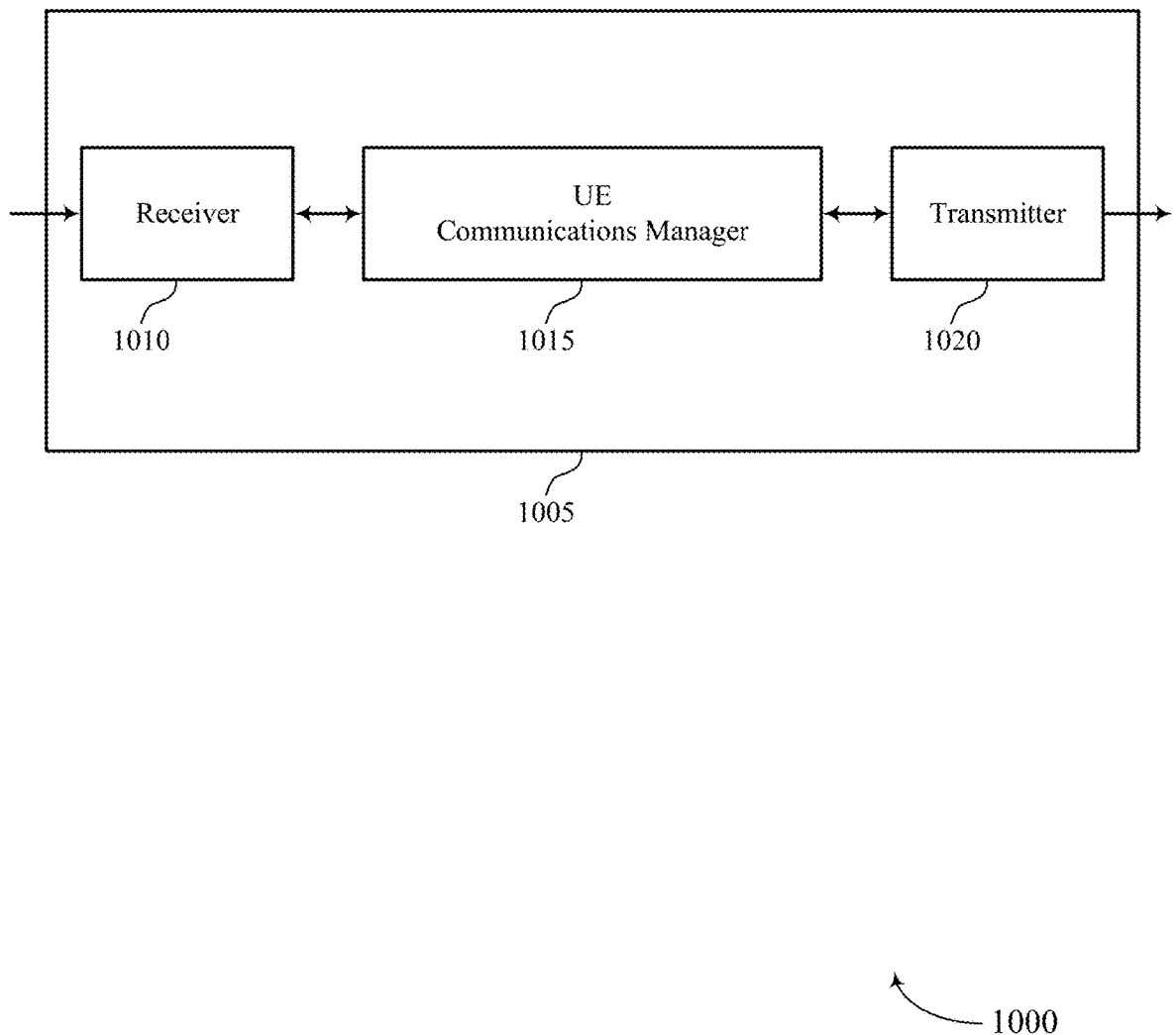
FIGS. 10 and 11 show block diagrams of devices that support techniques for managing uplink transmissions for power saving in accordance with aspects of the present disclosure.

FIG. 10 shows a block diagram 1000 of a device 1005 that supports techniques for managing uplink transmissions for power saving in accordance with aspects of the present disclosure. The device 1005 may be an example of aspects of a UE 115 as described herein. The device 1005 may include a receiver 1010, a UE communications manager 1015, and a transmitter 1020. The device 1005 may also include at least one processor. Each of these components may be in communication with one another (e.g., via one or more buses).

The receiver 1010 may receive information such as packets, user data, or control information associated with various information channels (e.g., control channels, data channels, and information related to techniques for managing uplink transmissions for power saving.). Information may be passed on to other components of the device 1005. The receiver 1010 may be an example of aspects of the transceiver 1320 described with reference to FIG. 13. The receiver 1010 may utilize a single antenna or a set of antennas.

The UE communications manager 1015 may be implemented as an integrated circuit or chipset for the device 1005, and the receiver 1010 and the transmitter 1020 may be implemented as analog components (for example, amplifiers, filters, antennas) coupled with the device 1005 modem to enable wireless transmission and reception. The actions performed by the UE communications manager 1015 as described herein may be implemented to realize one or more potential advantages. At least one implementation may enable the UE communications manager 1015 to manage transmission of pose information during a downlink burst occasion. For example, the UE communications manager 1015 may determine a downlink burst occasion for an XR application, generate pose information associated with the device 1005 and the XR application, and transmit the pose information during the downlink burst occasion. The UE communications manager 1015 may be an example of aspects of the UE communications manager 1310 described herein. Based on implementing the managing of the transmission of the pose information, one or more processors of the device 1005 (for example, processor(s) controlling or incorporated with the UE communications manager 1015) may promote improvements to power saving, and, in some examples, may promote higher reliability and lower latency XR-related operations, among other benefits.

The UE communications manager 1015, or its sub-components, may be implemented in hardware, software (e.g., executed by at least one processor), or any combination thereof. If implemented in code executed by at least one processor, the functions of the UE communications manager 1015, or its sub-components may be executed by at least one general-purpose processor, a digital signaling processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The UE communications manager 1015, or its sub-components, may be physically located at various positions, including being distributed such that portions of functions are implemented at different physical locations by one or more physical components. In some examples, the UE communications manager 1015, or its sub-components, may be a separate and distinct component in accordance with various aspects of the present disclosure. In some examples, the UE communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver component. For example, the transmitter 1020 may be an example of aspects of the transceiver 1320 described with reference to FIG. 13. The transmitter 1020 may utilize a single antenna or a set of antennas.

Figure 11:
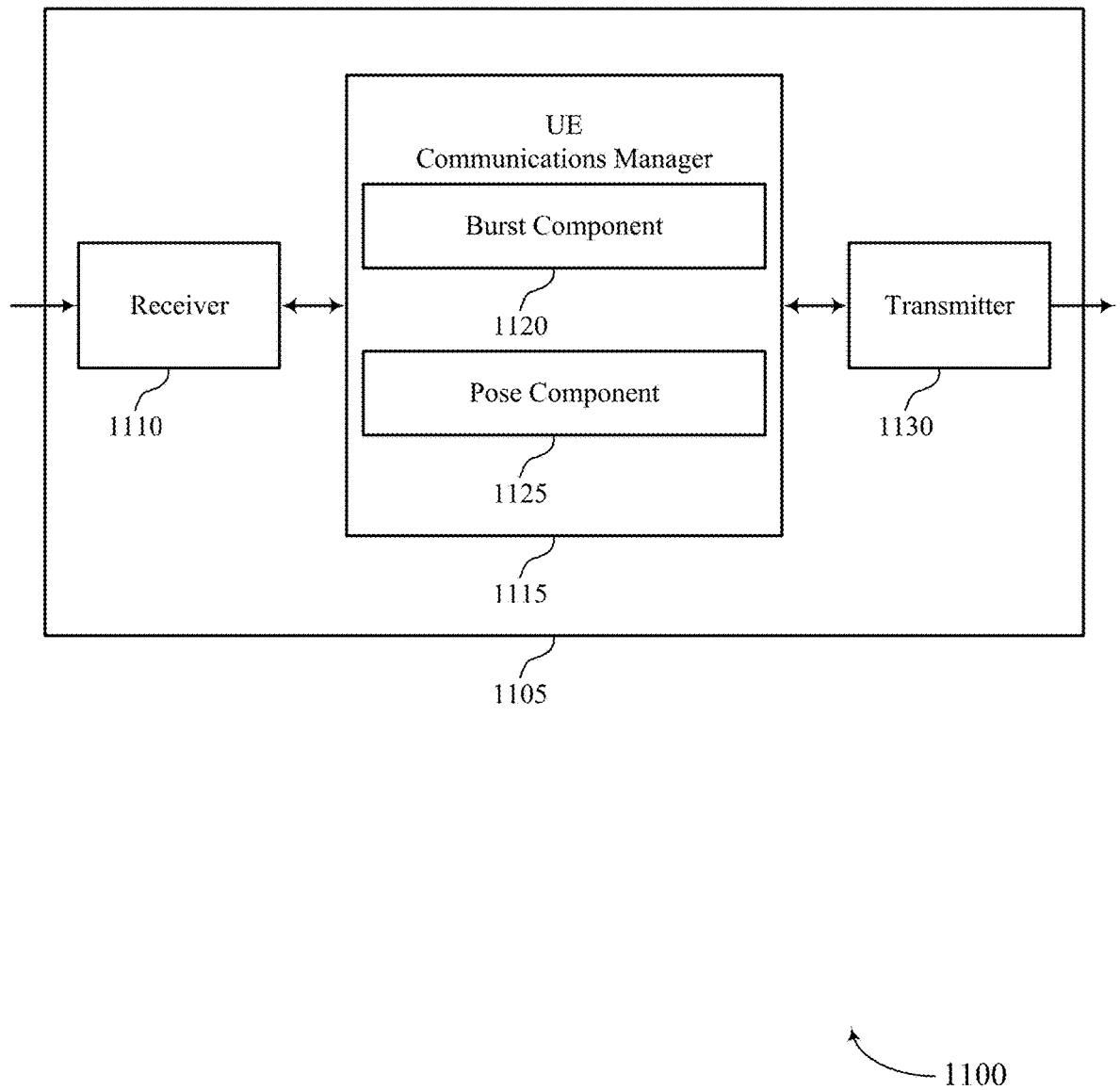

FIG. 11 shows a block diagram 1100 of a device 1105 that supports techniques for managing uplink transmissions for power saving in accordance with aspects of the present disclosure. The device 1105 may be an example of aspects of a device 1005, or a UE 115 as described herein. The device 1105 may include a receiver 1110, a UE communications manager 1115, and a transmitter 1130. The device 1105 may also include at least one processor. Each of these components may be in communication with one another (e.g., via one or more buses).

The receiver 1110 may receive information such as packets, user data, or control information associated with various information channels (e.g., control channels, data channels, and information related to techniques for managing uplink transmissions for power saving). Information may be passed on to other components of the device 1105. The receiver 1110 may be an example of aspects of the transceiver 1320 described with reference to FIG. 13. The receiver 1110 may utilize a single antenna or a set of antennas.

The UE communications manager 1115 may be an example of aspects of the UE communications manager 1015 as described herein. The UE communications manager 1115 may include a burst component 1120 and a pose component 1125. The UE communications manager 1115 may be an example of aspects of the UE communications manager 1310 described herein. The burst component 1120 may determine a downlink burst occasion for an XR application. The pose component 1125 may generate pose information associated with the UE and the XR application and transmit the pose information during the downlink burst occasion.

The transmitter 1130 may transmit signals generated by other components of the device 1105. In some examples, the transmitter 1130 may be collocated with a receiver 1110 in a transceiver component. For example, the transmitter 1130 may be an example of aspects of the transceiver 1320 described with reference to FIG. 13. The transmitter 1130 may utilize a single antenna or a set of antennas.

Figure 12:
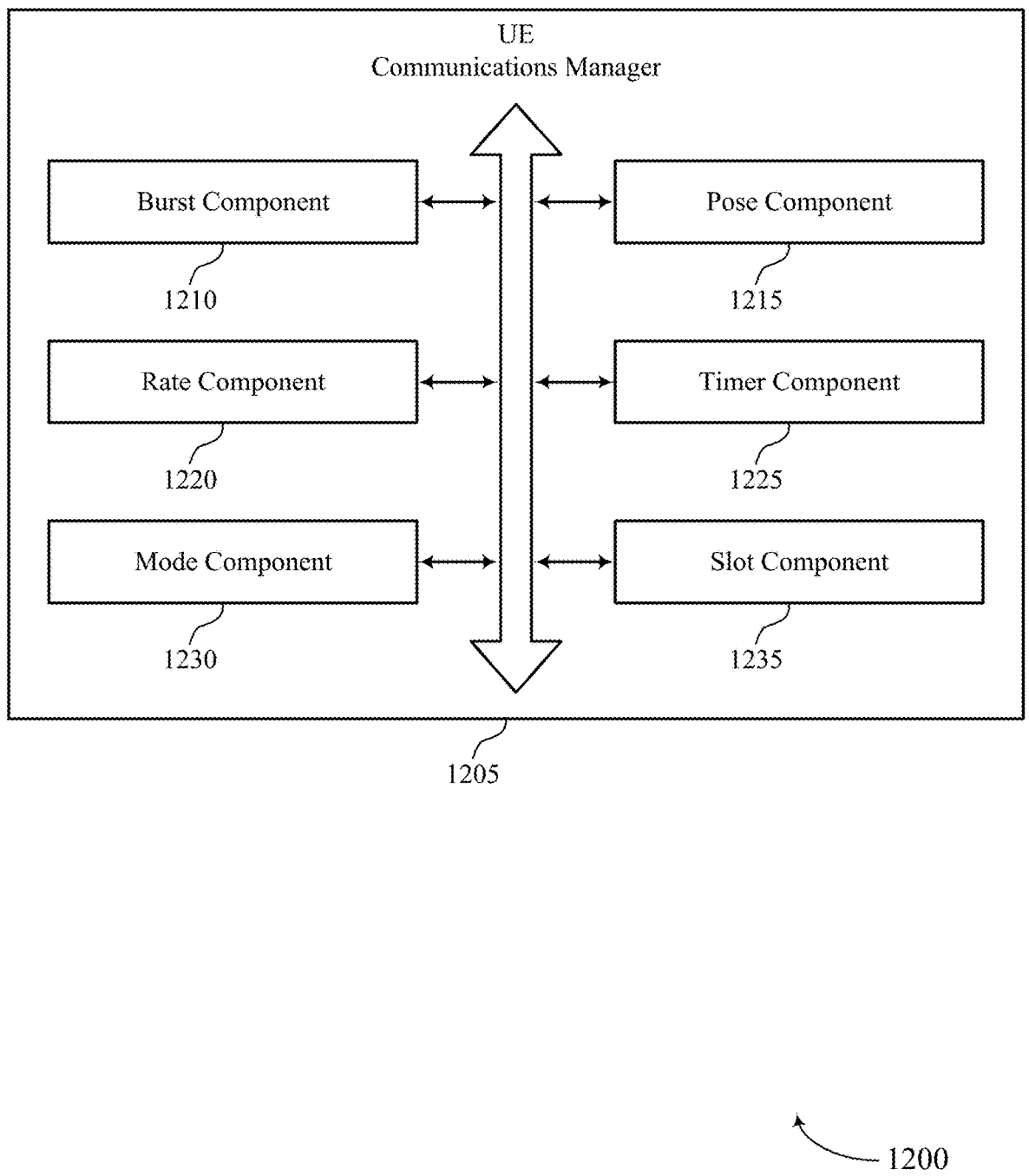
FIG. 12 shows a block diagram of a UE communications manager that supports techniques for managing uplink transmissions for power saving in accordance with aspects of the present disclosure.

FIG. 12 shows a block diagram 1200 of a UE communications manager 1205 that supports techniques for managing uplink transmissions for power saving in accordance with aspects of the present disclosure. The UE communications manager 1205 may be an example of aspects of a UE communications manager 1015, a UE communications manager 1115, or a UE communications manager 1310 described herein. The UE communications manager 1205 may include a burst component 1210, a pose component 1215, a rate component 1220, a timer component 1225, a mode component 1230, and a slot component 1235. Each of these components may communicate, directly or indirectly, with one another (e.g., via one or more buses).

The burst component 1210 may determine a downlink burst occasion for an XR application. The pose component 1215 may generate pose information associated with the UE and the XR application. In some examples, the pose component 1215 may transmit the pose information during the downlink burst occasion. In some examples, the pose component 1215 may generate a set of pose information associated with the UE. In some examples, the pose component 1215 may determine a subset of pose information of the set of pose information to transmit during the downlink burst occasion based on a configuration. The pose component 1215 may receive, from a base station, the configuration to transmit the subset of pose information during the downlink burst occasion. The pose component 1215 may transmit the subset of pose information jointly during the downlink burst occasion. In some cases, the subset of pose information includes two or more consecutive generated pose information.

The rate component 1220 may determine an uplink transmit rate associated with the pose information, the uplink transmit rate may be greater than or equal to a downlink transmit rate associated with the downlink burst occasion. In some examples, the rate component 1220 may transmit the pose information based at least in part on the uplink transmit rate. In some examples, the rate component 1220 may adjust the uplink transmit rate associated with the pose information based on a downlink transmit rate associated with the downlink burst occasion. In some examples, the rate component 1220 may transmit the pose information once during the downlink burst occasion based on the adjusted uplink transmit rate. In some examples, the rate component 1220 may decrease the uplink transmit rate to match the downlink transmit rate.

The rate component 1220 may adjust an uplink pose generation rate associated with the pose information based on the adjusted uplink transmit rate. In some examples, the rate component 1220 may generate the pose information associated with the UE and the XR application based on the adjusted uplink pose generation rate, where the adjusted uplink pose generation rate matches a downlink frame generation rate. In some examples, the rate component 1220 may identify an uplink transmit rate or an uplink periodicity, or both, associated with the pose information based on the configuration. The rate component 1220 may transmit the subset of pose information during the downlink burst occasion based on the identified uplink transmit rate or the uplink periodicity, or both.

The timer component 1225 may enable a timer based on the downlink burst occasion. The mode component 1230 may switch from a first state to a second state based on the enabled timer, where the first state corresponds to a first power level lower than a second power level associated with the second state. The slot component 1235 may determine a beginning period associated with an earliest transport block transmission of one or more transport block transmissions associated with the downlink burst occasion. In some examples, the slot component 1235 may determine an earliest uplink slot following the beginning period associated with the earliest transport block transmission. The slot component 1235 may transmit the pose information associated with the UE in the earliest uplink slot following the beginning period associated with the earliest transport block transmission.

The slot component 1235 may determine an earliest downlink slot associated with the earliest transport block transmission of the one or more transport block transmissions associated with the downlink burst occasion based on the beginning period associated with the earliest transport block transmission, where determining the earliest uplink slot is based on the earliest downlink slot. In some examples, the slot component 1235 may determine one or more uplink slots preceding the earliest downlink slot associated with the earliest transport block transmission of the one or more transport block transmissions associated with the downlink burst occasion. The slot component 1235 may transmit the pose information associated with the UE during the one or more uplink slots preceding the earliest downlink slot associated with the earliest transport block transmission. In some cases, the beginning period associated with the earliest transport block transmission corresponds to a beginning of an active DRX duration. In some cases, the active DRX duration is aligned with an expected beginning period of the earliest transport block transmission. In some cases, the one or more uplink slots satisfy a slot window threshold.

Figure 13:
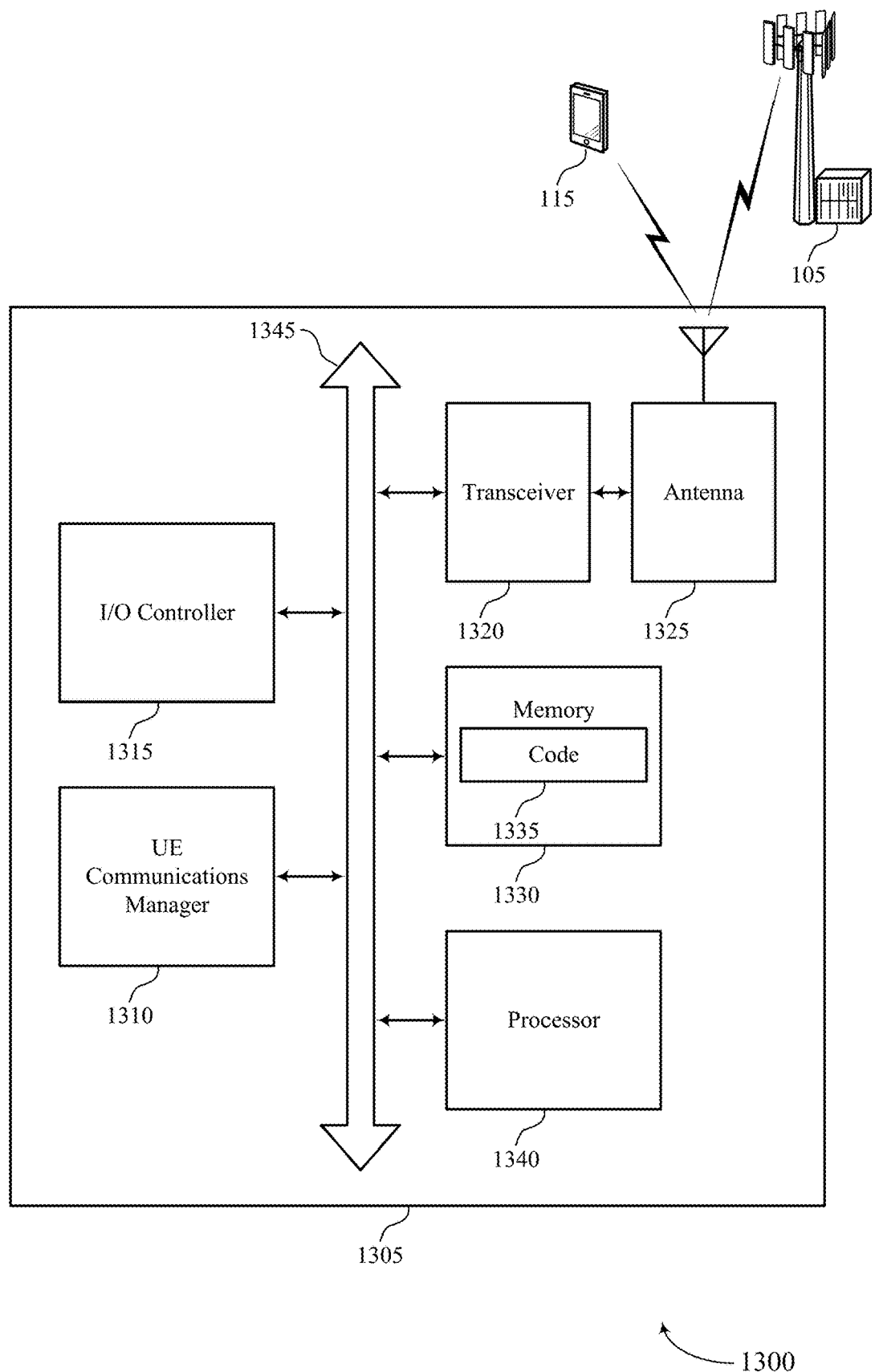
FIG. 13 shows a diagram of a system including a device that supports techniques for managing uplink transmissions for power saving in accordance with aspects of the present disclosure.

FIG. 13 shows a diagram of a system 1300 including a device 1305 that supports techniques for managing uplink transmissions for power saving in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a UE communications manager 1310, an I/O controller 1315, a transceiver 1320, an antenna 1325, memory 1330, and at least one processor 1340. These components may be in electronic communication via one or more buses (e.g., bus 1345).

At least one implementation may enable the UE communications manager 1310 to manage transmission of pose information during a downlink burst occasion. For example, the UE communications manager 1310 may determine a downlink burst occasion for an XR application, generate pose information associated with the device 1305 and the XR application, and transmit the pose information during the downlink burst occasion. Based on implementing the managing of the transmission of the pose information, one or more processors of the device 1305 (for example, processor(s) controlling or incorporated with the UE communications manager 1310) may promote improvements to power consumption, and, in some examples, may promote enhanced efficiency for high reliability and low latency XR-related operations, among other benefits.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of at least one processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas. In some cases, the device 1305 may include a single antenna 1325. However, in some cases, the device 1305 may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the at least one processor 1340 to perform various functions described herein. In some cases, the memory 1330 may contain, among other things, a basic input/output system (BIOS) which may control basic hardware or software operation such as the interaction with peripheral components or devices.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the at least one processor 1340 but may cause a computer (e.g., when compiled and executed) to perform functions described herein.

The at least one processor 1340 may include an intelligent hardware device, (e.g., at least one general-purpose processor, a DSP, a CPU, a microcontroller, an ASIC, an FPGA, a programmable logic device, a discrete gate or transistor logic component, a discrete hardware component, or any combination thereof). In some cases, the at least one processor 1340 may be configured to operate a memory array using a memory controller. In other cases, a memory controller may be integrated into the at least one processor 1340. The at least one processor 1340 may be configured to execute computer-readable instructions stored in a memory (e.g., the memory 1330) to cause the device 1305 to perform various functions (e.g., functions or tasks supporting techniques for managing uplink transmissions for power saving).

Figure 14:
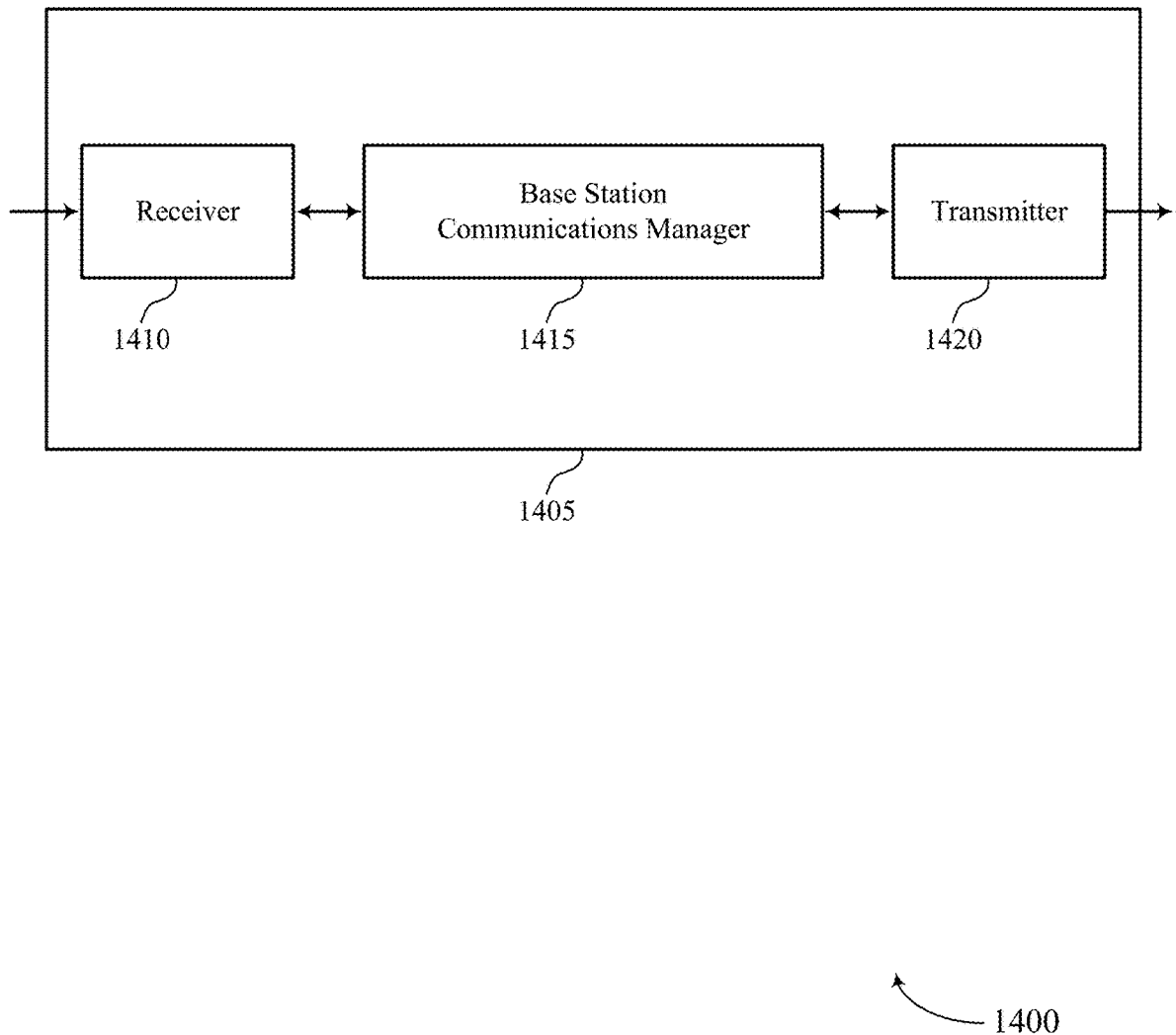
FIGS. 14 and 15 show block diagrams of devices that support techniques for managing uplink transmissions for power saving in accordance with aspects of the present disclosure.

FIG. 14 shows a block diagram 1400 of a device 1405 that supports techniques for managing uplink transmissions for power saving in accordance with aspects of the present disclosure. The device 1405 may be an example of aspects of a base station 105 as described herein. The device 1405 may include a receiver 1410, a base station communications manager 1415, and a transmitter 1420. The device 1405 may also include at least one processor. Each of these components may be in communication with one another (e.g., via one or more buses).

The receiver 1410 may receive information such as packets, user data, or control information associated with various information channels (e.g., control channels, data channels, and information related to techniques for managing uplink transmissions for power saving). Information may be passed on to other components of the device 1405. The receiver 1410 may be an example of aspects of the transceiver 1720 described with reference to FIG. 17. The receiver 1410 may utilize a single antenna or a set of antennas.

The base station communications manager 1415 may transmit, to a UE, one or more frames associated with an XR application during a downlink burst occasion and receive pose information associated with the UE and the XR application during the downlink burst occasion. The base station communications manager 1415 may be an example of aspects of the base station communications manager 1710 described herein.

The base station communications manager 1415, or its sub-components, may be implemented in hardware, software (e.g., executed by at least one processor), or any combination thereof. If implemented in code executed by at least one processor, the functions of the base station communications manager 1415, or its sub-components may be executed by at least one general-purpose processor, a DSP, an ASIC, a FPGA or other programmable logic device, discrete gate or transistor logic, discrete hardware components, or any combination thereof designed to perform the functions described in the present disclosure.

The base station communications manager 1415, or its sub-components, may be physically located at various positions, including being distributed such that portions of functions are implemented at different physical locations by one or more physical components. In some examples, the base station communications manager 1415, or its sub-components, may be a separate and distinct component in accordance with various aspects of the present disclosure. In some examples, the base station communications manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver component. For example, the transmitter 1420 may be an example of aspects of the transceiver 1720 described with reference to FIG. 17. The transmitter 1420 may utilize a single antenna or a set of antennas.

Figure 15:
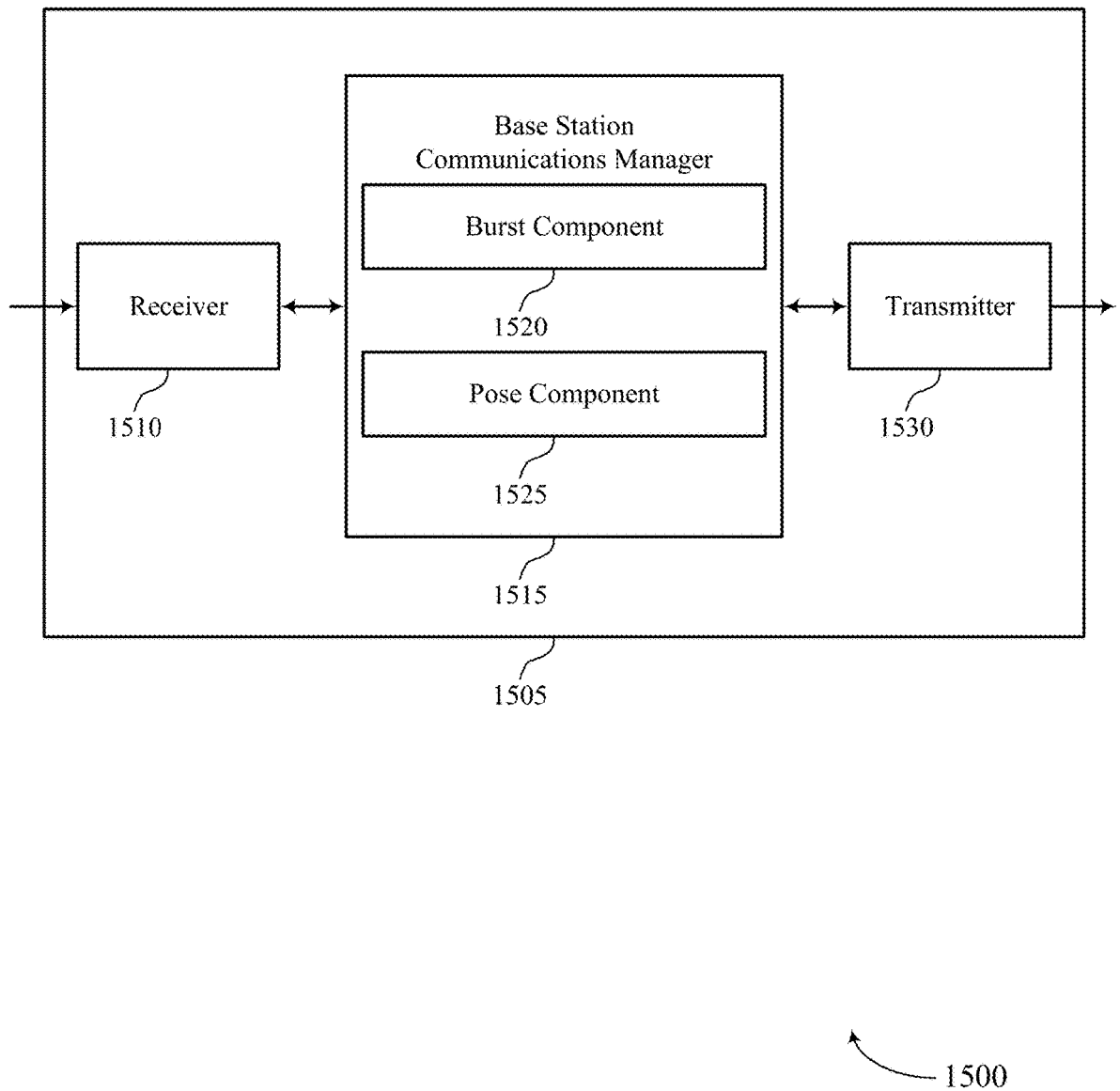

FIG. 15 shows a block diagram 1500 of a device 1505 that supports techniques for managing uplink transmissions for power saving in accordance with aspects of the present disclosure. The device 1505 may be an example of aspects of a device 1405, or a base station 105 as described herein. The device 1505 may include a receiver 1510, a base station communications manager 1515, and a transmitter 1530. The device 1505 may also include at least one processor. Each of these components may be in communication with one another (e.g., via one or more buses).

The receiver 1510 may receive information such as packets, user data, or control information associated with various information channels (e.g., control channels, data channels, and information related to techniques for managing uplink transmissions for power saving.). Information may be passed on to other components of the device 1505. The receiver 1510 may be an example of aspects of the transceiver 1720 described with reference to FIG. 17. The receiver 1510 may utilize a single antenna or a set of antennas.

The base station communications manager 1515 may be an example of aspects of the base station communications manager 1415 as described herein. The base station communications manager 1515 may include a burst component 1520 and a pose component 1525. The base station communications manager 1515 may be an example of aspects of the base station communications manager 1710 described herein. The burst component 1520 may transmit, to a UE, one or more frames associated with an XR application during a downlink burst occasion. The pose component 1525 may receive pose information associated with the UE and the XR application during the downlink burst occasion.

The transmitter 1530 may transmit signals generated by other components of the device 1505. In some examples, the transmitter 1530 may be collocated with a receiver 1510 in a transceiver component. For example, the transmitter 1530 may be an example of aspects of the transceiver 1720 described with reference to FIG. 17. The transmitter 1530 may utilize a single antenna or a set of antennas.

Figure 16:
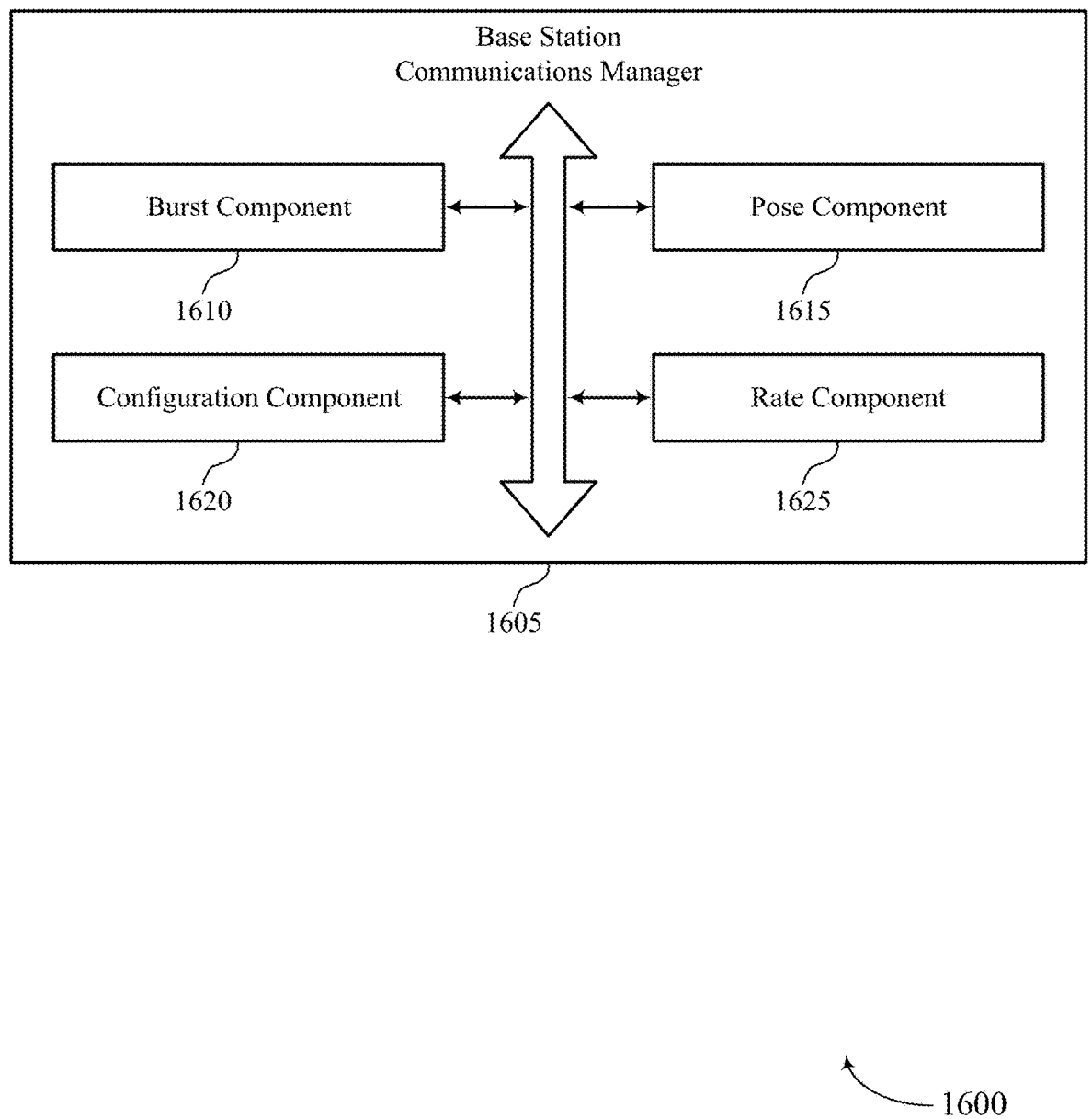
FIG. 16 shows a block diagram of a base station communications manager that supports techniques for managing uplink transmissions for power saving in accordance with aspects of the present disclosure.

FIG. 16 shows a block diagram 1600 of a base station communications manager 1605 that supports techniques for managing uplink transmissions for power saving in accordance with aspects of the present disclosure. The base station communications manager 1605 may be an example of aspects of a base station communications manager 1415, a base station communications manager 1515, or a base station communications manager 1710 described herein. The base station communications manager 1605 may include a burst component 1610, a pose component 1615, a configuration component 1620, and a rate component 1625. Each of these components may communicate, directly or indirectly, with one another (e.g., via one or more buses).

The burst component 1610 may transmit, to a UE, one or more frames associated with an XR application during a downlink burst occasion. The pose component 1615 may receive pose information associated with the UE and the XR application during the downlink burst occasion. The configuration component 1620 may transmit, to the UE, a configuration to jointly transmit a subset of pose information of a set of pose information during the downlink burst occasion, where the subset of pose information includes two or more consecutive pose information. In some examples, the configuration component 1620 may receive the subset of pose information jointly during the downlink burst occasion based on the configuration. The rate component 1625 may assign an uplink transmit rate or an uplink periodicity, or both, associated with the pose information. In some examples, the rate component 1625 may include an indication of the uplink transmit rate or the uplink periodicity, or both, in the configuration.

Figure 17:
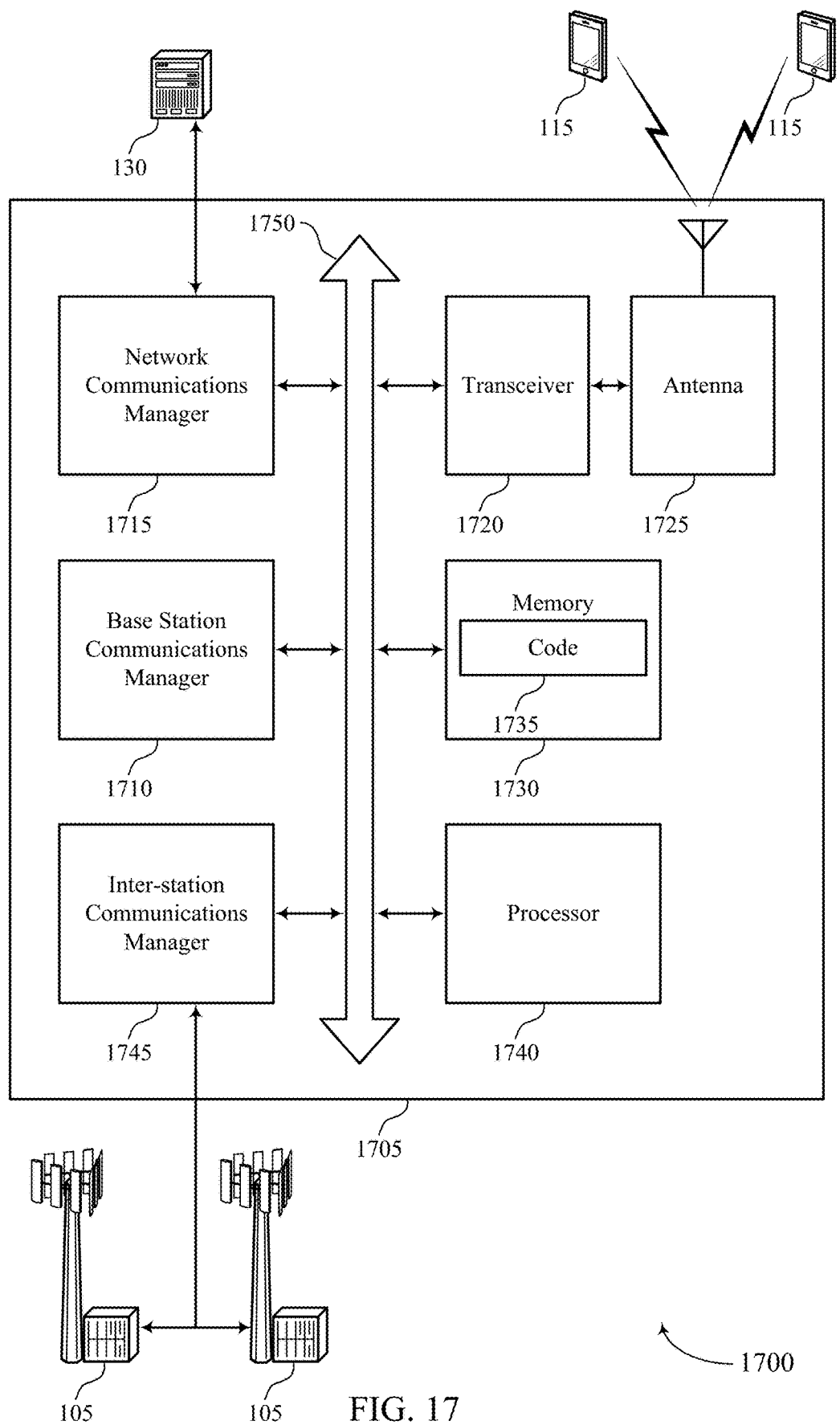
FIG. 17 shows a diagram of a system including a device that supports techniques for managing uplink transmissions for power saving in accordance with aspects of the present disclosure.

FIG. 17 shows a diagram of a system 1700 including a device 1705 that supports techniques for managing uplink transmissions for power saving in accordance with aspects of the present disclosure. The device 1705 may be an example of or include the components of device 1405, device 1505, or a base station 105 as described herein. The device 1705 may include components for bi-directional voice and data communications including components for transmitting and receiving communications, including a base station communications manager 1710, a network communications manager 1715, a transceiver 1720, an antenna 1725, memory 1730, at least one processor 1740, and an inter-station communications manager 1745. These components may be in electronic communication via one or more buses (e.g., bus 1750).

At least one implementation may enable the base station communications manager 1710 to manage communications associated with an XR application during a downlink burst occasion. For example, the base station communications manager 1710 may transmit, to a UE, one or more frames associated with the XR application during the downlink burst occasion and receive pose information associated with the UE and the XR application during the downlink burst occasion. Based on implementing the managing of the communications associated with the XR application, one or more processors of the device 1705 (for example, processor(s) controlling or incorporated with the base station communications manager 1710) may promote high reliability and low latency XR-related operations, among other benefits.

The network communications manager 1715 may manage communications with the core network (e.g., via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas. In some cases, the device 1705 may include a single antenna 1725. However, in some cases, the device 1705 may have more than one antenna 1725, which may be capable of concurrently transmitting or receiving multiple wireless transmissions.

The memory 1730 may include RAM, ROM, or a combination thereof. The memory 1730 may store computer-readable code 1735 including instructions that, when executed by at least one processor (e.g., the at least one processor 1740) cause the device to perform various functions described herein. In some cases, the memory 1730 may contain, among other things, a BIOS which may control basic hardware or software operation such as the interaction with peripheral components or devices.

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the at least one processor 1740 but may cause a computer (e.g., when compiled and executed) to perform functions described herein.

The at least one processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1740 may be configured to operate a memory array using a memory controller. In some cases, a memory controller may be integrated into the at least one processor 1740. The at least one processor 1740 may be configured to execute computer-readable instructions stored in a memory (e.g., the memory 1730) to cause the device 1705 to perform various functions (e.g., functions or tasks supporting techniques for managing uplink transmissions for power saving).

The inter-station communications manager 1745 may manage communications with other base station 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

Figure 18:
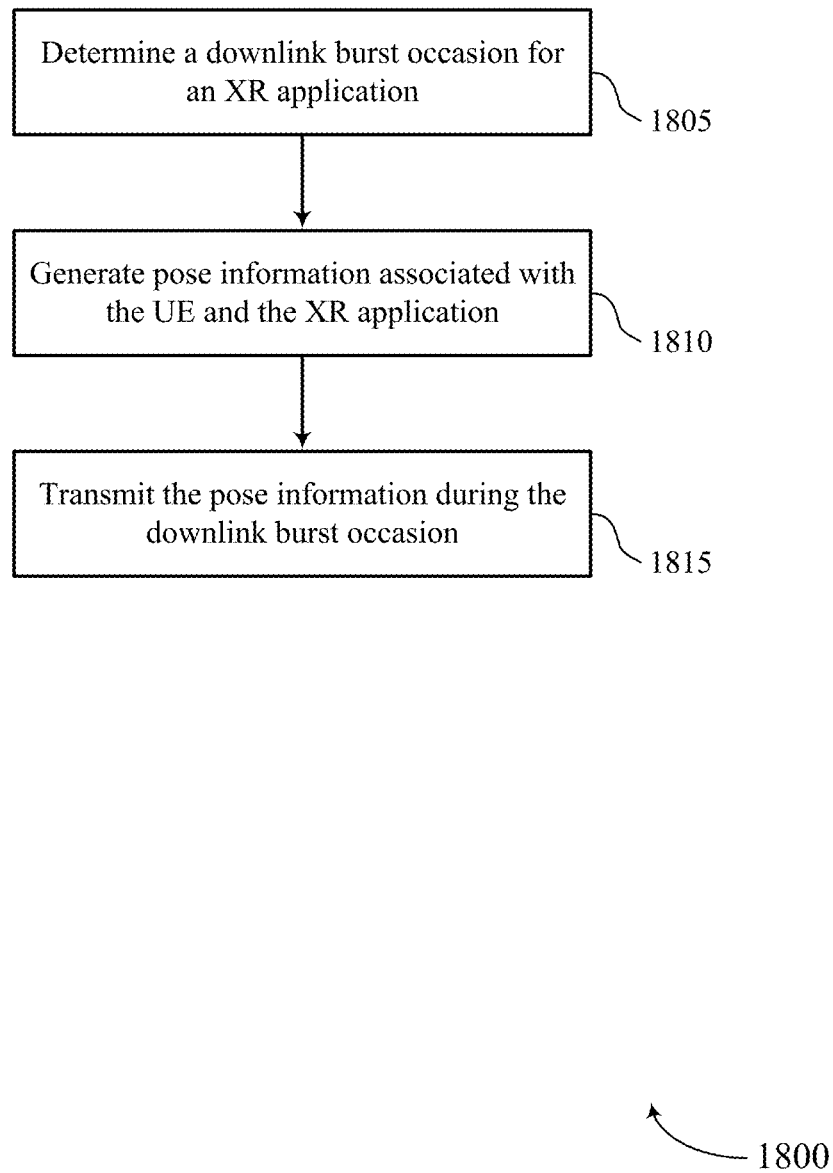
FIGS. 18 through 22 show flowcharts illustrating methods that support techniques for managing uplink transmissions for power saving in accordance with aspects of the present disclosure.

FIG. 18 shows a flowchart illustrating a method 1800 that supports techniques for managing uplink transmissions for power saving in accordance with aspects of the present disclosure. The operations of method 1800 may be implemented by a UE or its components as described herein. For example, the operations of method 1800 may be performed by a UE communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1805, the UE may determine a downlink burst occasion for an XR application. The operations of 1805 may be performed according to the methods described herein. In some examples, aspects of the operations of 1805 may be performed by a burst component as described with reference to FIGS. 10 through 13.

At 1810, the UE may generate pose information associated with the UE and the XR application. The operations of 1810 may be performed according to the methods described herein. In some examples, aspects of the operations of 1810 may be performed by a pose component as described with reference to FIGS. 10 through 13.

At 1815, the UE may transmit the pose information during the downlink burst occasion. The operations of 1815 may be performed according to the methods described herein. In some examples, aspects of the operations of 1815 may be performed by a pose component as described with reference to FIGS. 10 through 13.

Figure 19:
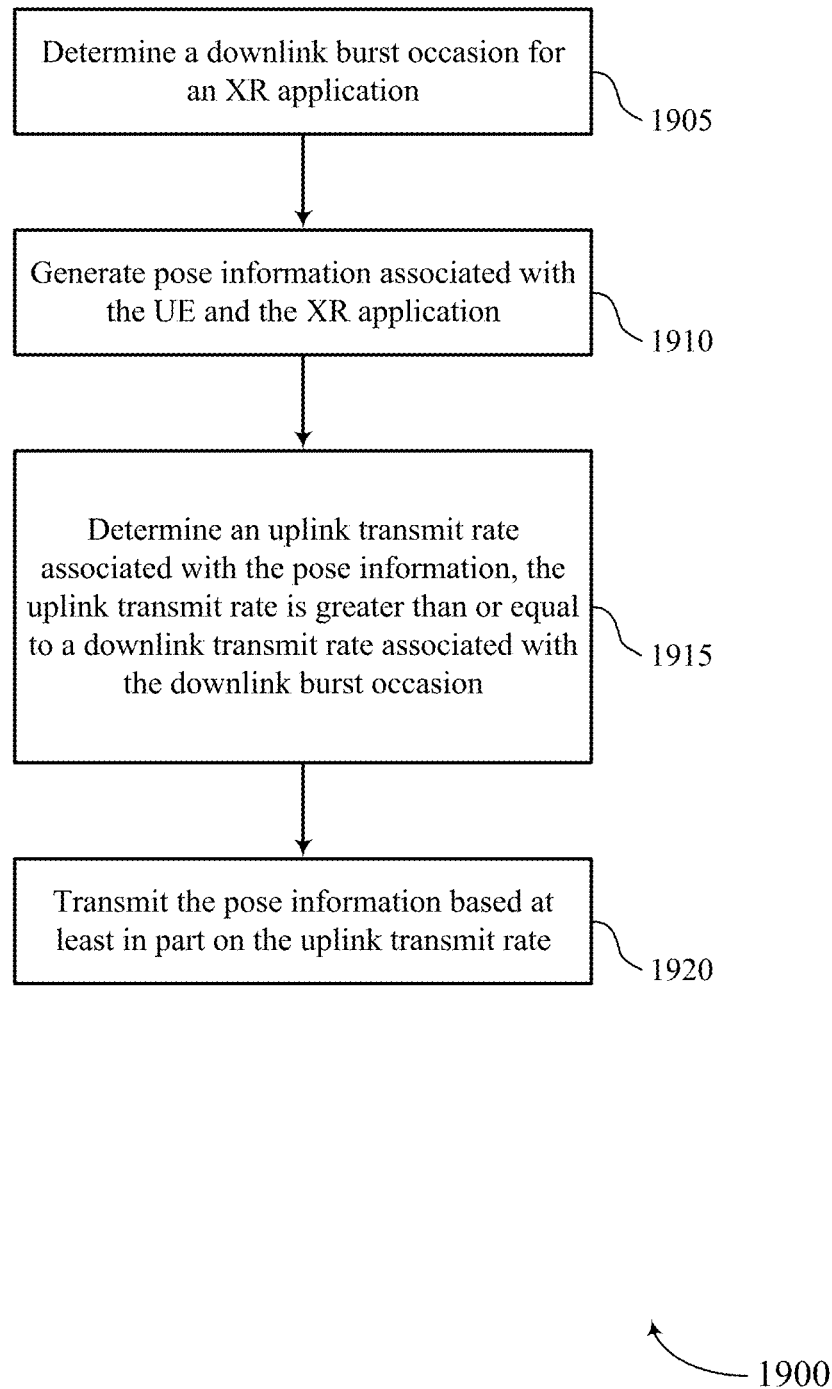

FIG. 19 shows a flowchart illustrating a method 1900 that supports techniques for managing uplink transmissions for power saving in accordance with aspects of the present disclosure. The operations of method 1900 may be implemented by a UE or its components as described herein. For example, the operations of method 1900 may be performed by a UE communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1905, the UE may determine a downlink burst occasion for an XR application. The operations of 1905 may be performed according to the methods described herein. In some examples, aspects of the operations of 1905 may be performed by a burst component as described with reference to FIGS. 10 through 13.

At 1910, the UE may generate pose information associated with the UE and the XR application. The operations of 1910 may be performed according to the methods described herein. In some examples, aspects of the operations of 1910 may be performed by a pose component as described with reference to FIGS. 10 through 13.

At 1915, the UE may determine an uplink transmit rate associated with the pose information, the uplink transmit rate is greater than or equal to a downlink transmit rate associated with the downlink burst occasion. The downlink transmit rate corresponds to a number of frame transmissions per second. The uplink transmit rate corresponds to a number of pose information transmissions per second. The operations of 1915 may be performed according to the methods described herein. In some examples, aspects of the operations of 1915 may be performed by a rate component as described with reference to FIGS. 10 through 13.

At 1920, the UE may transmit the pose information based at least in part on the uplink transmit rate. The operations of 1920 may be performed according to the methods described herein. In some examples, aspects of the operations of 1920 may be performed by a pose component as described with reference to FIGS. 10 through 13.

Figure 20:
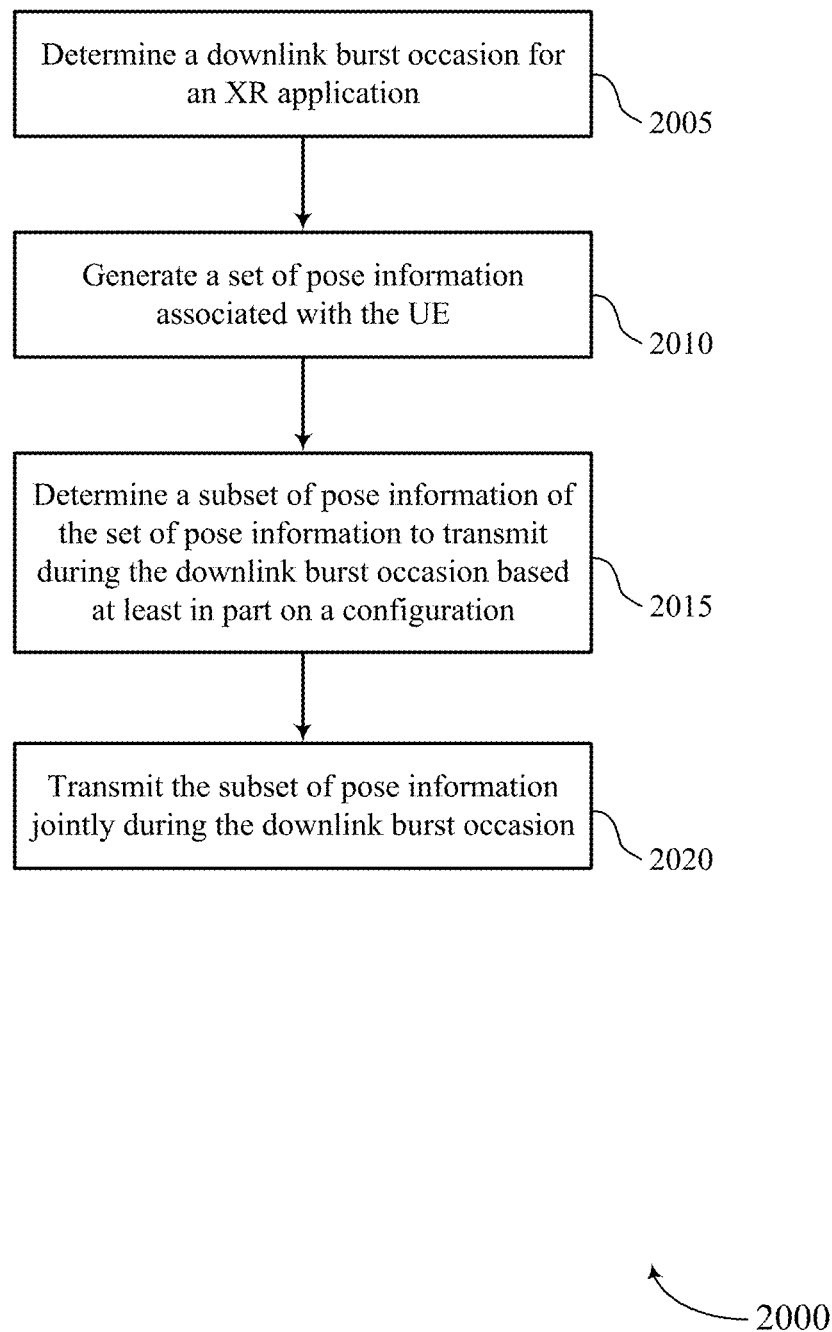

FIG. 20 shows a flowchart illustrating a method 2000 that supports techniques for managing uplink transmissions for power saving in accordance with aspects of the present disclosure. The operations of method 2000 may be implemented by a UE or its components as described herein. For example, the operations of method 2000 may be performed by a UE communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 2005, the UE may determine a downlink burst occasion for an XR application. The operations of 2005 may be performed according to the methods described herein. In some examples, aspects of the operations of 2005 may be performed by a burst component as described with reference to FIGS. 10 through 13.

At 2010, the UE may generate a set of pose information associated with the UE. The operations of 2010 may be performed according to the methods described herein. In some examples, aspects of the operations of 2010 may be performed by a pose component as described with reference to FIGS. 10 through 13.

At 2015, the UE may determine a subset of pose information of the set of pose information to transmit during the downlink burst occasion based at least in part on a configuration. The operations of 2015 may be performed according to the methods described herein. In some examples, aspects of the operations of 2015 may be performed by a pose component as described with reference to FIGS. 10 through 13.

At 2020, the UE may transmit the subset of pose information jointly during the downlink burst occasion. The operations of 2020 may be performed according to the methods described herein. In some examples, aspects of the operations of 2020 may be performed by a pose component as described with reference to FIGS. 10 through 13.

Figure 21:
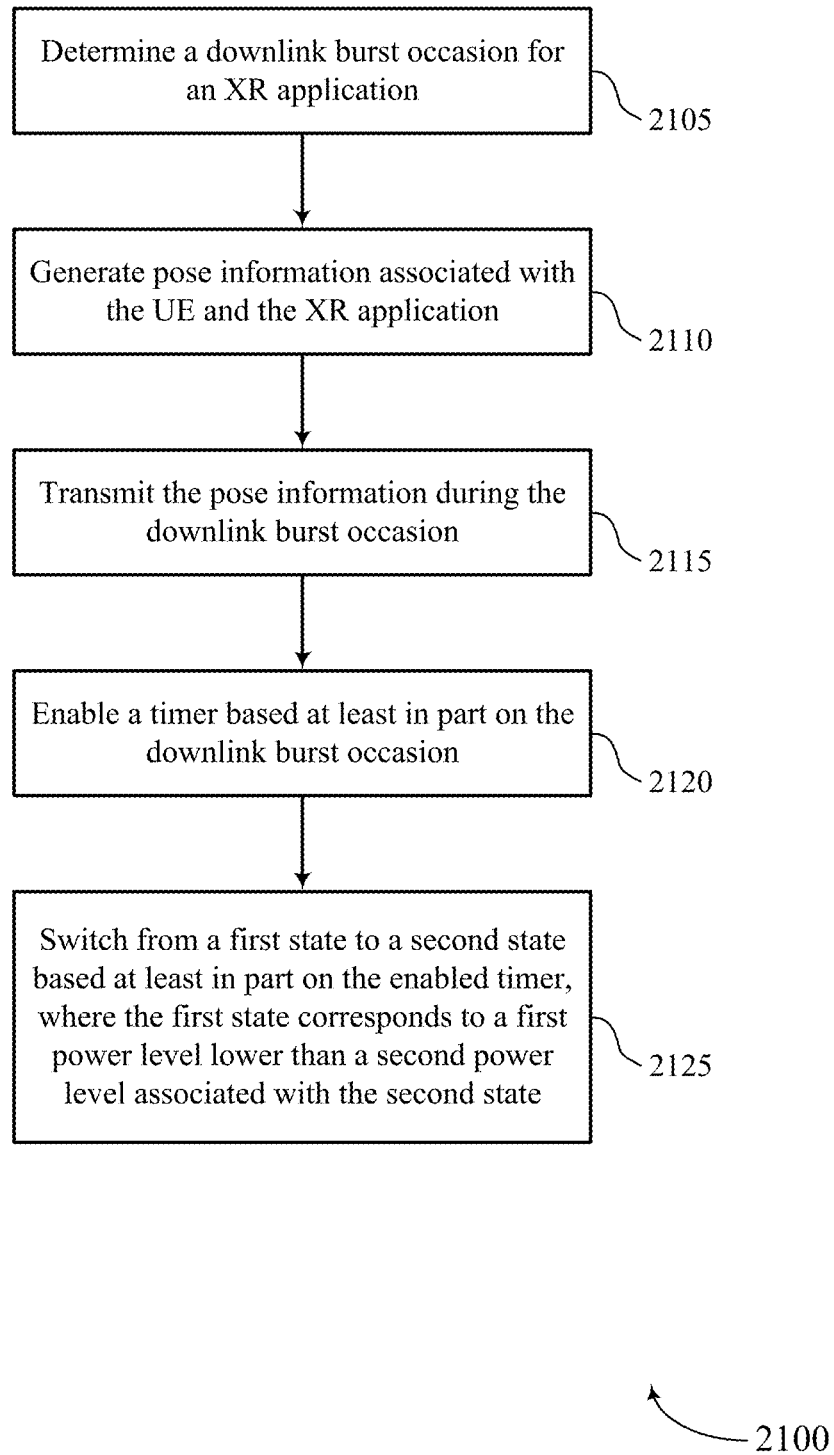

FIG. 21 shows a flowchart illustrating a method 2100 that supports techniques for managing uplink transmissions for power saving in accordance with aspects of the present disclosure. The operations of method 2100 may be implemented by a UE or its components as described herein. For example, the operations of method 2100 may be performed by a UE communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 2105, the UE may determine a downlink burst occasion for an XR application. The operations of 2105 may be performed according to the methods described herein. In some examples, aspects of the operations of 2105 may be performed by a burst component as described with reference to FIGS. 10 through 13.

At 2110, the UE may generate pose information associated with the UE and the XR application. The operations of 2110 may be performed according to the methods described herein. In some examples, aspects of the operations of 2110 may be performed by a pose component as described with reference to FIGS. 10 through 13.

At 2115, the UE may transmit the pose information during the downlink burst occasion. The operations of 2115 may be performed according to the methods described herein. In some examples, aspects of the operations of 2115 may be performed by a pose component as described with reference to FIGS. 10 through 13.

At 2120, the UE may enable a timer based at least in part on the downlink burst occasion. The operations of 2120 may be performed according to the methods described herein. In some examples, aspects of the operations of 2120 may be performed by a timer component as described with reference to FIGS. 10 through 13.

At 2125, the UE may switch from a first state to a second state based at least in part on the enabled timer, where the first state corresponds to a first power level lower than a second power level associated with the second state. The operations of 2125 may be performed according to the methods described herein. In some examples, aspects of the operations of 2125 may be performed by a mode component as described with reference to FIGS. 10 through 13.

Figure 22:
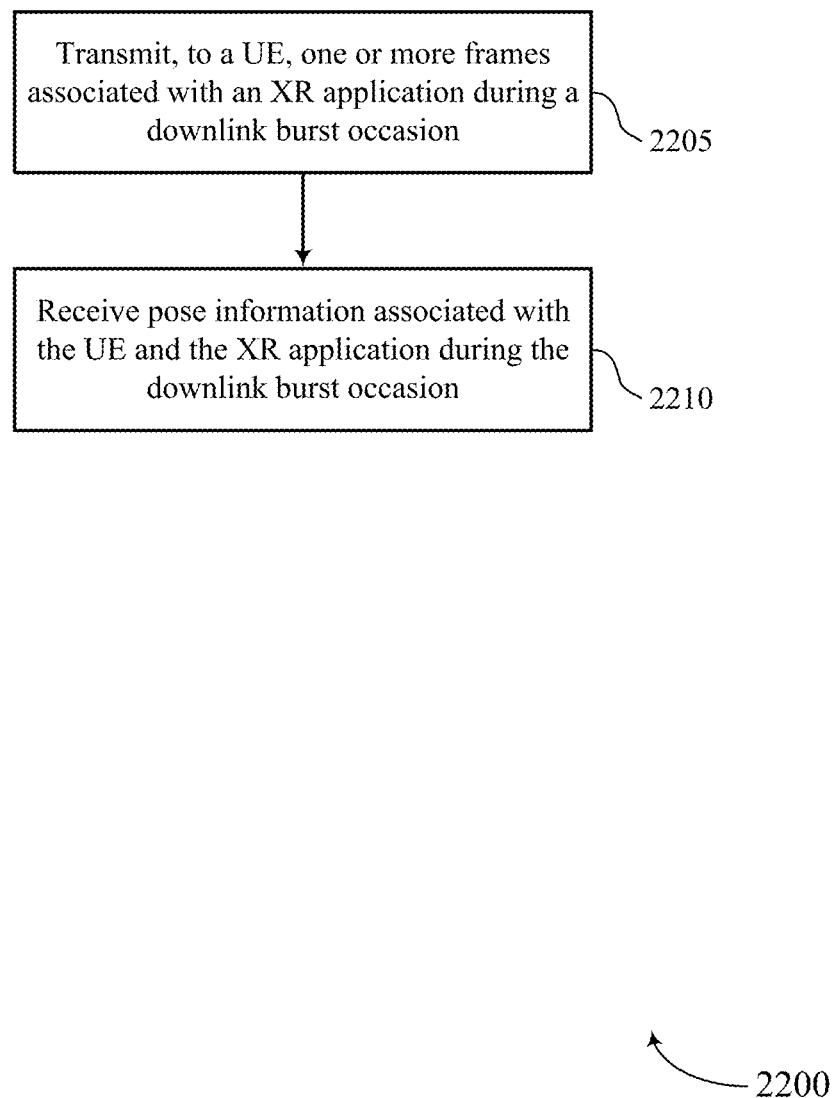

FIG. 22 shows a flowchart illustrating a method 2200 that supports techniques for managing uplink transmissions for power saving in accordance with aspects of the present disclosure. The operations of method 2200 may be implemented by a base station or its components as described herein. For example, the operations of method 2200 may be performed by a base station communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2205, the base station may transmit, to a UE, one or more frames associated with an XR application during a downlink burst occasion. The operations of 2205 may be performed according to the methods described herein. In some examples, aspects of the operations of 2205 may be performed by a burst component as described with reference to FIGS. 14 through 17.

At 2210, the base station may receive pose information associated with the UE and the XR application during the downlink burst occasion. The operations of 2210 may be performed according to the methods described herein. In some examples, aspects of the operations of 2210 may be performed by a pose component as described with reference to FIGS. 14 through 17.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: determining a downlink burst occasion for an XR application; generating pose information associated with the UE and the XR application; and transmitting the pose information during the downlink burst occasion.

Aspect 2: The method of aspect 1, further comprising: determining an uplink transmit rate associated with the pose information, the uplink transmit rate is greater than or equal to a downlink transmit rate associated with the downlink burst occasion, wherein transmitting the pose information comprises: transmitting the pose information based at least in part on the uplink transmit rate.

Aspect 3: The method of aspect 2, further comprising: adjusting the uplink transmit rate associated with the pose information based at least in part on the downlink transmit rate associated with the downlink burst occasion, wherein transmitting the pose information comprises: transmitting the pose information once during the downlink burst occasion based at least in part on the adjusted uplink transmit rate.

Aspect 4: The method of aspect 3, wherein adjusting the uplink transmit rate comprises: decreasing the uplink transmit rate to match the downlink transmit rate.

Aspect 5: The method of any of aspects 3 through 4, further comprising: adjusting an uplink pose generation rate associated with the pose information based at least in part on the adjusted uplink transmit rate, wherein generating the pose information comprises: generating the pose information associated with the UE and the XR application based at least in part on the adjusted uplink pose generation rate, wherein the adjusted uplink pose generation rate matches a downlink frame generation rate.

Aspect 6: The method of any of aspects 1 through 5, further comprising: generating a set of pose information associated with the UE; and determining a subset of pose information of the set of pose information to transmit during the downlink burst occasion based at least in part on a configuration, wherein transmitting the pose information comprises: transmitting the subset of pose information jointly during the downlink burst occasion.

Aspect 7: The method of aspect 6, wherein the subset of pose information comprises two or more consecutive generated pose information.

Aspect 8: The method of any of aspects 6 through 7, further comprising: receiving, from a base station, the configuration to transmit the subset of pose information during the downlink burst occasion.

Aspect 9: The method of any of aspects 6 through 8, further comprising: identifying an uplink transmit rate or an uplink periodicity, or both, associated with the pose information based at least in part on the configuration, wherein transmitting the subset of pose information comprises: transmitting the subset of pose information during the downlink burst occasion based at least in part on the identified uplink transmit rate or the uplink periodicity, or both.

Aspect 10: The method of any of aspects 1 through 9, further comprising: enabling a timer based at least in part on the downlink burst occasion.

Aspect 11: The method of aspect 10, further comprising: switching from a first state to a second state based at least in part on the enabled timer, wherein the first state corresponds to a first power level lower than a second power level associated with the second state.

Aspect 12: The method of any of aspects 1 through 11, further comprising: determining a beginning period associated with an earliest transport block transmission of one or more transport block transmissions associated with the downlink burst occasion; and determining an earliest uplink slot following the beginning period associated with the earliest transport block transmission, wherein transmitting the pose information comprises: transmitting the pose information associated with the UE in the earliest uplink slot following the beginning period associated with the earliest transport block transmission.

Aspect 13: The method of aspect 12, wherein the beginning period associated with the earliest transport block transmission corresponds to a beginning of an active discontinuous reception duration.

Aspect 14: The method of aspect 13, wherein the active discontinuous reception duration is aligned with an expected beginning period of the earliest transport block transmission.

Aspect 15: The method of any of aspects 12 through 14, further comprising: determining an earliest downlink slot associated with the earliest transport block transmission of the one or more transport block transmissions associated with the downlink burst occasion based at least in part on the beginning period associated with the earliest transport block transmission, wherein determining the earliest uplink slot is based at least in part on the earliest downlink slot.

Aspect 16: The method of aspect 15, further comprising: determining one or more uplink slots preceding the earliest downlink slot associated with the earliest transport block transmission of the one or more transport block transmissions associated with the downlink burst occasion, wherein transmitting the pose information comprises: transmitting the pose information associated with the UE during the one or more uplink slots preceding the earliest downlink slot associated with the earliest transport block transmission.

Aspect 17: The method of aspect 16, wherein the one or more uplink slots satisfy a slot window threshold.

Aspect 18: A method for wireless communication at a base station, comprising: transmitting, to a UE, one or more frames associated with an XR application during a downlink burst occasion; and receiving pose information associated with the UE and the XR application during the downlink burst occasion.

Aspect 19: The method of aspect 18, further comprising: transmitting, to the UE, a configuration to jointly transmit a subset of pose information of a set of pose information during the downlink burst occasion, wherein the subset of pose information comprises two or more consecutive pose information.

Aspect 20: The method of aspect 19, wherein receiving the pose information comprises: receiving the subset of pose information jointly during the downlink burst occasion based at least in part on the configuration.

Aspect 21: The method of any of aspects 19 through 20, further comprising: assigning an uplink transmit rate or an uplink periodicity, or both, associated with the pose information; and including an indication of the uplink transmit rate or the uplink periodicity, or both, in the configuration.

Aspect 22: An apparatus for wireless communication, comprising at least one processor; memory coupled to the at least one processor; and instructions stored in the memory and executable by the at least one processor to cause the apparatus to perform a method of any of aspects 1 through 17.

Aspect 23: An apparatus for wireless communication, comprising at least one means for performing a method of any of aspects 1 through 17.

Aspect 24: A non-transitory computer-readable medium storing code for wireless communication at a UE, the code comprising instructions executable by at least one processor to perform a method of any of aspects 1 through 17.

Aspect 25: An apparatus for wireless communication, comprising at least one processor; memory coupled to the at least one processor; and instructions stored in the memory and executable by the at least one processor to cause the apparatus to perform a method of any of aspects 18 through 21.

Aspect 26: An apparatus for wireless communication, comprising at least one means for performing a method of any of aspects 18 through 21.

Aspect 27: A non-transitory computer-readable medium storing code for wireless communication at a base station, the code comprising instructions executable by at least one processor to perform a method of any of aspects 18 through 21.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with at least one general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by at least one processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by at least one processor, the functions may be stored on or transmitted over as one or more instructions or code on a computer-readable medium. Other examples and implementations are within the scope of the disclosure and appended claims. For example, due to the nature of software, functions described herein may be implemented using software executed by at least one processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    determining a downlink burst occasion for an extended reality application;
    generating pose information associated with the UE and the extended reality application; and
    transmitting the pose information during the downlink burst occasion.

2. The method of claim 1, further comprising:
    determining an uplink transmit rate associated with the pose information, the uplink transmit rate is greater than or equal to a downlink transmit rate associated with the downlink burst occasion, wherein transmitting the pose information comprises:
    transmitting the pose information based at least in part on the uplink transmit rate.

3. The method of claim 2, further comprising:
    adjusting the uplink transmit rate associated with the pose information based at least in part on the downlink transmit rate associated with the downlink burst occasion, wherein transmitting the pose information comprises:
    transmitting the pose information once during the downlink burst occasion based at least in part on the adjusted uplink transmit rate.

4. The method of claim 3, wherein adjusting the uplink transmit rate comprises:
    decreasing the uplink transmit rate to match the downlink transmit rate.

5. The method of claim 3, further comprising:
    adjusting an uplink pose generation rate associated with the pose information based at least in part on the adjusted uplink transmit rate, wherein generating the pose information comprises:
    generating the pose information associated with the UE and the extended reality application based at least in part on the adjusted uplink pose generation rate, wherein the adjusted uplink pose generation rate matches a downlink frame generation rate.

6. The method of claim 1, further comprising:
    generating a set of pose information associated with the UE; and
    determining a subset of pose information of the set of pose information to transmit during the downlink burst occasion based at least in part on a configuration, wherein transmitting the pose information comprises:
    transmitting the subset of pose information jointly during the downlink burst occasion.

7. The method of claim 6, wherein the subset of pose information comprises two or more consecutive generated pose information.

8. The method of claim 6, further comprising:
receiving, from a base station, the configuration to transmit the subset of pose information during the downlink burst occasion.

9. The method of claim 6, further comprising:
identifying an uplink transmit rate or an uplink periodicity, or both, associated with the pose information based at least in part on the configuration, wherein transmitting the subset of pose information comprises:
transmitting the subset of pose information during the downlink burst occasion based at least in part on the identified uplink transmit rate or the uplink periodicity, or both.

10. The method of claim 1, further comprising:
enabling a timer based at least in part on the downlink burst occasion.

11. The method of claim 10, further comprising:
switching from a first state to a second state based at least in part on the enabled timer, wherein the first state corresponds to a first power level lower than a second power level associated with the second state.

12. The method of claim 1, further comprising:
determining a beginning period associated with an earliest transport block transmission of one or more transport block transmissions associated with the downlink burst occasion; and
determining an earliest uplink slot following the beginning period associated with the earliest transport block transmission, wherein transmitting the pose information comprises:
transmitting the pose information associated with the UE in the earliest uplink slot following the beginning period associated with the earliest transport block transmission.

13. The method of claim 12, wherein the beginning period associated with the earliest transport block transmission corresponds to a beginning of an active discontinuous reception duration.

14. The method of claim 13, wherein the active discontinuous reception duration is aligned with an expected beginning period of the earliest transport block transmission.

15. The method of claim 12, further comprising:
determining an earliest downlink slot associated with the earliest transport block transmission of the one or more transport block transmissions associated with the downlink burst occasion based at least in part on the beginning period associated with the earliest transport block transmission, wherein determining the earliest uplink slot is based at least in part on the earliest downlink slot.

16. The method of claim 15, further comprising:
determining one or more uplink slots preceding the earliest downlink slot associated with the earliest transport block transmission of the one or more transport block transmissions associated with the downlink burst occasion, wherein transmitting the pose information comprises:
transmitting the pose information associated with the UE during the one or more uplink slots preceding the earliest downlink slot associated with the earliest transport block transmission.

17. The method of claim 16, wherein the one or more uplink slots satisfy a slot window threshold.

18. A method for wireless communication at a base station, comprising:
transmitting, to a user equipment (UE), one or more frames associated with an extended reality application during a downlink burst occasion; and
receiving pose information associated with the UE and the extended reality application during the downlink burst occasion.

19. The method of claim 18, further comprising:
transmitting, to the UE, a configuration to jointly transmit a subset of pose information of a set of pose information during the downlink burst occasion, wherein the subset of pose information comprises two or more consecutive pose information.

20. The method of claim 19, wherein receiving the pose information comprises:
receiving the subset of pose information jointly during the downlink burst occasion based at least in part on the configuration.

21. The method of claim 19, further comprising:
assigning an uplink transmit rate or an uplink periodicity, or both, associated with the pose information; and
including an indication of the uplink transmit rate or the uplink periodicity, or both, in the configuration.

22. An apparatus for wireless communication, comprising:
at least one processor,
memory coupled to the at least one processor; and
instructions stored in the memory and executable by the at least one processor to cause the apparatus to:
determine a downlink burst occasion for an extended reality application;
generate pose information associated with the apparatus and the extended reality application; and
transmit the pose information during the downlink burst occasion.

23. The apparatus of claim 22, wherein the instructions are further executable by the at least one processor to cause the apparatus to:
determine an uplink transmit rate associated with the pose information, the uplink transmit rate is greater than or equal to a downlink transmit rate associated with the downlink burst occasion, wherein the instructions to transmit the pose information are further executable by the at least one processor to cause the apparatus to:
transmit the pose information based at least in part on the uplink transmit rate.

24. The apparatus of claim 23, wherein the instructions are further executable by the at least one processor to cause the apparatus to:
adjust the uplink transmit rate associated with the pose information based at least in part on the downlink transmit rate associated with the downlink burst occasion, wherein the instructions to transmit the pose information are further executable by the at least one processor to cause the apparatus to:
transmit the pose information once during the downlink burst occasion based at least in part on the adjusted uplink transmit rate.

25. The apparatus of claim 24, wherein the instructions to adjust the uplink transmit rate are executable by the at least one processor to cause the apparatus to:
decrease the uplink transmit rate to match the downlink transmit rate.

26. The apparatus of claim 24, wherein the instructions are further executable by the at least one processor to cause the apparatus to:

adjust an uplink pose generation rate associated with the pose information based at least in part on the adjusted uplink transmit rate, wherein the instructions to generate the pose information are further executable by the at least one processor to cause the apparatus to:
generate the pose information associated with the apparatus and the extended reality application based at least in part on the adjusted uplink pose generation rate, wherein the adjusted uplink pose generation rate matches a downlink frame generation rate.

27. The apparatus of claim 22, wherein the instructions are further executable by the at least one processor to cause the apparatus to:
generate a set of pose information associated with the apparatus; and
determine a subset of pose information of the set of pose information to transmit during the downlink burst occasion based at least in part on a configuration, wherein the instructions to transmit the pose information are further executable by the at least one processor to cause the apparatus to:
transmit the subset of pose information jointly during the downlink burst occasion.

28. The apparatus of claim 27, wherein the subset of pose information comprises two or more consecutive generated pose information.

29. The apparatus of claim 27, wherein the instructions are further executable by the at least one processor to cause the apparatus to:
receive, from a base station, the configuration to transmit the subset of pose information during the downlink burst occasion.

30. An apparatus for wireless communication, comprising:
at least one processor,
memory coupled to the at least one processor; and
instructions stored in the memory and executable by the at least one processor to cause the apparatus to:
transmit, to a user equipment (UE), one or more frames associated with an extended reality application during a downlink burst occasion; and
receive pose information associated with the UE and the extended reality application during the downlink burst occasion.

\* \* \* \* \*